(12) United States Patent
Oh

(10) Patent No.: US 11,284,147 B2
(45) Date of Patent: Mar. 22, 2022

(54) ELECTRONIC APPARATUS, METHOD OF CONTROLLING THE SAME AND RECORDING MEDIUM THEREOF

(71) Applicant: SAMSUNG ELECTRONICS CO., LTD., Suwon-si (KR)

(72) Inventor: Sungbo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/369,208

(22) Filed: Mar. 29, 2019

(65) Prior Publication Data
US 2019/0306555 A1 Oct. 3, 2019

(30) Foreign Application Priority Data

Apr. 2, 2018 (KR) ........................ 10-2018-0038067

(51) Int. Cl.
| | | |
|---|---|---|
| *H04N 7/01* | (2006.01) | |
| *H04N 21/41* | (2011.01) | |
| *G06F 1/16* | (2006.01) | |
| *G06F 9/30* | (2018.01) | |
| *H04N 21/43* | (2011.01) | |
| *H04N 21/462* | (2011.01) | |
| *H04N 21/4402* | (2011.01) | |
| *H04N 21/4363* | (2011.01) | |
| *H04N 21/81* | (2011.01) | |
| *H04N 21/436* | (2011.01) | |
| *G09G 5/00* | (2006.01) | |

(Continued)

(52) U.S. Cl.
CPC ....... *H04N 21/4126* (2013.01); *G06F 1/1698* (2013.01); *G06F 9/3004* (2013.01); *H04N 21/4307* (2013.01); *H04N 21/440218* (2013.01); *H04N 21/4621* (2013.01); *G09G 5/005* (2013.01); *H04L 12/282* (2013.01); *H04N 21/433* (2013.01); *H04N 21/436* (2013.01); *H04N 21/43615* (2013.01); *H04N 21/43632* (2013.01); *H04N 21/43637* (2013.01); *H04N 21/4516* (2013.01); *H04N 21/8166* (2013.01)

(58) Field of Classification Search
CPC ..... G06F 1/1698; G06F 9/3004; G09G 5/005; H04N 21/440218
USPC .................... 348/734, 552, 553, 441, 445
See application file for complete search history.

(56) References Cited

U.S. PATENT DOCUMENTS 8,898,347 B2 11/2014 Sasaki et al.
9,681,183 B1 6/2017 Majid
(Continued)

FOREIGN PATENT DOCUMENTS

| CN | 102648633 A | 8/2012 |
|---|---|---|
| CN | 105491413 A | 4/2016 |

(Continued)

OTHER PUBLICATIONS

Communication dated Jul. 15, 2019, issued by the European Patent Office in counterpart European Application No. 19166298.0.

(Continued)

*Primary Examiner* — Michael Lee
*Assistant Examiner* — Jean W Desir
(74) *Attorney, Agent, or Firm* — Sughrue Mion, PLLC

(57) ABSTRACT

An electronic apparatus for controlling reproduction of content on display apparatuses according to a format optimized for reproduction and consistency.

20 Claims, 16 Drawing Sheets

(51) Int. Cl.
*H04L 12/28* (2006.01)
*H04N 21/433* (2011.01)
*H04N 21/45* (2011.01)

(56) References Cited

U.S. PATENT DOCUMENTS

| | | |
|---|---|---|
| 2005/0265395 A1 | 12/2005 | Kim et al. |
| 2006/0053452 A1 | 3/2006 | Lee et al. |
| 2008/0112364 A1 | 5/2008 | Kwon et al. |
| 2009/0044229 A1 | 2/2009 | Taylor |
| 2009/0320080 A1 | 12/2009 | McCafferty et al. |
| 2010/0208042 A1 | 8/2010 | Ikeda et al. |
| 2011/0072480 A1 | 3/2011 | Stone |
| 2011/0102544 A1 | 5/2011 | Kim |
| 2012/0023267 A1 | 1/2012 | Sasaki et al. |
| 2013/0279693 A1* | 10/2013 | Rothschild ............ G09G 5/006 380/200 |
| 2014/0266638 A1 | 9/2014 | Banks |
| 2014/0313414 A1 | 10/2014 | Wu |
| 2015/0264433 A1* | 9/2015 | Myung ............. H04N 5/23206 725/110 |
| 2016/0098239 A1 | 4/2016 | Lee et al. |
| 2016/0232937 A1* | 8/2016 | Yamamoto ............ H04N 5/765 |
| 2016/0292834 A1 | 10/2016 | Tsuru et al. |
| 2016/0294912 A1* | 10/2016 | Lee ....................... H04L 65/601 |
| 2017/0048577 A1 | 2/2017 | Chiou et al. |
| 2017/0251166 A1* | 8/2017 | Toma ................... H04N 21/431 |
| 2017/0374390 A1 | 12/2017 | Leleannec et al. |
| 2018/0310035 A1* | 10/2018 | Kawamae ............. H04N 19/46 |
| 2019/0191124 A1* | 6/2019 | Peng ................... H04N 7/0125 |

FOREIGN PATENT DOCUMENTS

| | | |
|---|---|---|
| CN | 105794216 A | 7/2016 |
| CN | 106101679 A | 11/2016 |
| EP | 2 265 003 A2 | 12/2010 |
| EP | 3 096 287 A1 | 11/2016 |
| WO | 2011/143403 A2 | 11/2011 |
| WO | 2016/063475 A1 | 4/2016 |

OTHER PUBLICATIONS

International Search Report (PCT/ISA/210) and Written Opinion (PCT/ISA/237) dated Jul. 25, 2019 issued by the International Searching Authority in International Application No. PCT/KR2019/003554.

Communication dated Feb. 18, 2021, issued by the European Patent Office in European Application No. 19166298.0.

Communication dated Dec. 2, 2021 issued by the China National Intellectual Property Administration in Chinese Application No. 201980022714.3.

* cited by examiner

ELECTRONIC APPARATUS, METHOD OF CONTROLLING THE SAME AND RECORDING MEDIUM THEREOF

CROSS-REFERENCE TO RELATED APPLICATION(S)

This application is based on and claims priority under 35 U.S.C. § 119 to Korean Patent Application No. 10-2018-0038067 filed on Apr. 2, 2018, in the Korean Intellectual Property Office, the disclosure of which is incorporated by reference herein in its entirety.

BACKGROUND

Field

Apparatuses and methods consistent with the embodiments relate to an electronic apparatus, a method of controlling the same, and a recording medium thereof, and more particularly to an electronic apparatus capable of processing an image improved in contrast, a method of controlling the same, and a recording medium thereof.

Description of the Related Art

Demand for content, based on which an image is naturally displayed as seen in humans' eyes, has increased with development of technology.

Accordingly, the performance of image capture devices, such as a camera, for capturing and creating content has been highly improved. For example, there is high-brightness image content in which expression ranges of contrast, sharpness, brightness, etc. are analyzed in more detail, like high dynamic range (HDR) content.

An electronic apparatus, such as an optical disc player, provides HDR content to a television (TV) or other external apparatus through a wired interface, such as a high-definition multimedia interface (HDMI).

With the recent widespread use of smart phones, tablet computers, and other mobile devices, the electronic apparatus may also provide image content to an external apparatus through wireless communication.

However, the external apparatus that receives image data through wireless communication may not support HDR content according to its specifications. In this case, the external apparatus cannot normally display the received HDR content, and thus a problem of image distortion arises.

SUMMARY

According to one embodiment, there is provided an electronic apparatus including: a connector configured to connect with a display apparatus by a wire; a communicator configured to perform wireless communication with an external apparatus; an image processor configured to process an image signal; and a processor configured to: based on sensing a connection with the external apparatus through the communicator, control the image processor to convert an image signal corresponding to content having a first format into an image signal corresponding to content having a second format different from the first format while the image signal corresponding to the content having the first format is transmitted to the display apparatus through the connector, and control the converted image signal corresponding to the content having the second format to be transmitted to the display apparatus through the connector and control the communicator to transmit the converted image signal corresponding to the content having the second format to the external apparatus.

The image processor may include a first image processor configured to process the image signal for output through the connector and a second image processor configured to process the image signal for output through the communicator, and based on sensing the connection with the external apparatus through the communicator, the second image processor is configured to convert the image signal corresponding to the content having the first format into the image signal corresponding to the content having the second format, and control the communicator to transmit the converted image signal corresponding to the content having the second format to the external apparatus.

Based on sensing the connection with the external apparatus through the communicator, the first image processor is configured to continuously process the image signal corresponding to the content having the first format being transmitted to the display apparatus through the connector, and control the processed image signal corresponding to the content having the first format to be transmitted to the display apparatus through the connector.

The processor may identify a display delay time of the content reproduced in the external apparatus, and control the content displayed on the external apparatus and the display apparatus to be synchronized by delaying the image signal transmitted to the display apparatus through the connector based on the display delay time of the content reproduced in the external apparatus.

The processor may sense the connection with the external apparatus through the communicator based on at least one of setting the wireless communication with the external apparatus, setting content to be provided to the external apparatus, or installing or executing an application for wireless communication in the external apparatus.

According to one embodiment, there is provided an electronic apparatus including: a connector configured to connect with a display apparatus by a wire; a communicator configured to perform wireless communication with an external apparatus; an image processor configured to process an image signal; and a processor configured to: based on sensing a connection with the external apparatus through the communicator, identify whether the external apparatus wirelessly connected through the communicator supports reproduction of content of a first format while transmitting an image signal corresponding to the content having the first format to the display apparatus through the connector, based on the reproduction of the content having the first format being unsupported by the external apparatus, control the image processor to convert the image signal corresponding to the content having the first format into an image signal corresponding to the content having a second format different from the first format that the external apparatus is able to reproduce, and control the converted image signal corresponding to the content having the second format to be transmitted to the display apparatus through the connector and control the communicator to transmit the converted image signal corresponding to the content having the second format to the external apparatus.

The processor may further identify whether the display apparatus connected through the connector supports the reproduction of the content having the first format, based on the display apparatus being identified to support the reproduction of the content having the first format, control the first image processor to continuously process the image signal corresponding to the content having the first format being transmitted to the display apparatus through the connector, and control the processed image signal corresponding to the content having the first format to be transmitted to the display apparatus through the connector.

The processor may identify a display delay time of the content reproduced in the external apparatus, and control content displayed on the external apparatus and the display apparatus to be synchronized by delaying an image signal transmitted to the display apparatus through the connector based on the identified display delay time of the content reproduced in the external apparatus.

The processor may receive identification data of the external apparatus through the communicator, and identify whether the external apparatus supports the content of the first format based on the received identification data.

The processor may sense the connection with the external apparatus through the communicator based on at least one of setting the wireless communication with the external apparatus, setting content to be provided to the external apparatus, or installing or executing an application for wireless communication in the external apparatus.

According to one embodiment, there is provided a method of controlling an electronic apparatus, the method including: sensing a wireless connection with an external apparatus through a communicator for wireless communication while an image signal corresponding to content having a first format is transmitted to a display apparatus through a wired-connected connector; converting the image signal corresponding to the content having the first format into an image signal corresponding to the content having a second format different from the first format; and transmitting the converted image signal corresponding to the content having the second format to the display apparatus through the connector and to the external apparatus through the communicator.

The electronic apparatus may include a first image processor configured to process the image signal for output through the connector and a second image processor configured to process the image signal for output through the communicator, and the conversion of the image signal may include converting the image signal corresponding to the content having the first format into the image signal corresponding to the content having the second format by the second image processor.

The method may further include: by the first image processor, continuously processing the image signal corresponding to the content having the first format being transmitted to the display apparatus through the connector; and transmitting the image signal corresponding to the content having the first format to the display apparatus through the connector.

The method may further include: identifying a display delay time of the content reproduced in the external apparatus; and controlling content displayed on the external apparatus and the display apparatus to be synchronized by delaying an image signal transmitted to the display apparatus through the connector based on the identified display delay time.

According to one embodiment, there is provided a method of controlling an electronic apparatus, the method including: sensing a connection with an external apparatus through a communicator for wireless communication while an image signal corresponding to content having a first format is transmitted to a display apparatus through a wired-connected connector; identifying whether the external apparatus connected wirelessly supports reproduction of the content of the first format; converting the image signal corresponding to the content having the first format into an image signal corresponding to content having a second format different from the first format based on the reproduction of the content having the first format being unsupported by the external apparatus; and transmitting the converted image signal corresponding to the content having the second format to the display apparatus through the connector and to the external apparatus through the communicator.

The electronic apparatus may include a first image processor configured to process an image signal for output through the connector and a second image processor configured to process an image signal for output through the communicator, and the conversion of the image signal may include converting the image signal corresponding to the content having the first format into the image signal corresponding to the content having the second format by the second image processor.

The method may further include: identifying whether the display apparatus connected through the connector supports content of the first format; and continuously transmitting the image signal corresponding to the content having the first format to the display apparatus through the connector based on the display apparatus being identified to support the content having the first format.

The method may further including: identifying a display delay time of the content in the external apparatus; and controlling content displayed on the external apparatus and the display apparatus to be synchronized by delaying the content transmitted to the display apparatus through the connector based on the identified display delay time.

According to one embodiment, there is provided a computer-readable nonvolatile recording medium, in which a program of a method executable by a processor of an electronic apparatus is recorded, the method including: sensing a wireless connection with an external apparatus through a communicator for wireless communication while an image signal corresponding to content having a first format is transmitted to a display apparatus through a wired-connected connector; converting the image signal corresponding to the content having the first format into an image signal corresponding to the content having a second format different from the first format; and transmitting the converted image signal corresponding to the content having the second format to the display apparatus through the connector and to the external apparatus through the communicator.

BRIEF DESCRIPTION OF THE DRAWINGS

The above and/or the aspects will become apparent and more readily appreciated from the following description of embodiments, taken in conjunction with the accompanying drawings, in which.

DETAILED DESCRIPTION OF EMBODIMENTS

Figure 1:
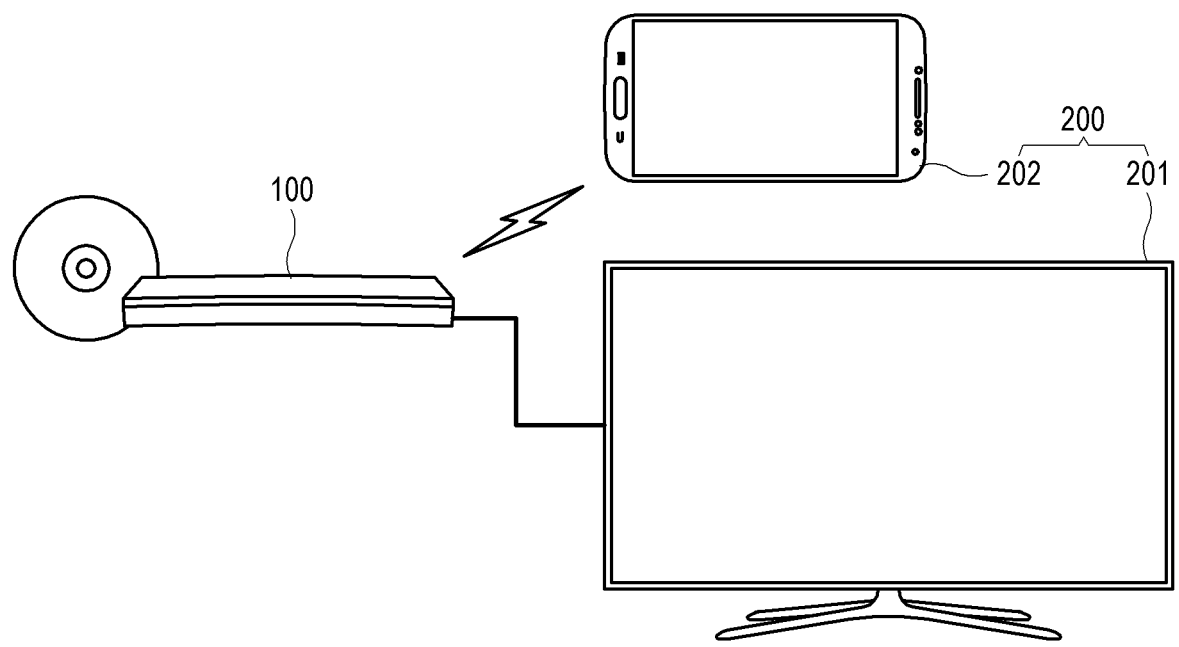
FIG. 1 is a diagram that illustrates a system including an electronic apparatus and an external apparatus according to an embodiment of the disclosure.

Below, embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the present inventive concept and the key configurations and functions. In the following descriptions, details about publicly known functions or features will be omitted if it is determined that they cloud the gist of the present inventive concept.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

FIG. 1 is a diagram that illustrates a system including an electronic apparatus and an external apparatus according to an embodiment of the disclosure.

As shown in FIG. 1, an electronic apparatus 100 according to an embodiment of the disclosure operates as a content provider, i.e. a source apparatus for providing image content (hereinafter, referred to as 'content') to at least one external apparatus 200. The electronic apparatus 100 may be provided as a player for reproducing content in the external apparatus 200.

The external apparatus 200 operates as a sync apparatus. The external apparatus 200 is wired or wirelessly connected to the electronic apparatus 100, and processes data output from the electronic apparatus 100, thereby displaying an image thereon based on the processed data. Further, the external apparatus 200 may perform a signal processing so that a moving image, a still image, an application, an on-screen display (OSD), a user interface (UI) for controlling various operations, etc. based on a signal/data stored in an internal or external storage medium can be displayed on a screen thereof.

According to an embodiment of the disclosure, the external apparatus 200 may include any of various apparatuses such as a display apparatus such as a television (TV); a mobile apparatus such as a smart phone, a smart pad or the like tablet computer, or a head mounted display (HMD) or the like wearable apparatus; a personal computer (PC) (or a monitor connected to a computer) such as a laptop computer or a desktop computer; etc.

The electronic apparatus 100 and the external apparatus 200 may be connected by a wired or wireless interface based on various wired or wireless standards.

The electronic apparatus 100 may include any apparatus for reproducing or relaying content, such as an optical disc player for a Blu-ray disc (BD) or a digital versatile disc (DVD), etc.; an audio/video (AV) receiver; a set-top box, a streaming apparatus such as a digital video recorder (DVR); etc.

According to an embodiment, as shown in FIG. 1, the external apparatus 200 includes a display apparatus 201 such as a television (TV) for processing a broadcast image based on at least one among a broadcast signal, broadcast information or broadcast data received from a transmitter of a broadcasting station. The broadcast signal received in the display apparatus 201 may be received through a ground wave of a conventional over the air broadcast signal, a cable, a satellite, etc., but a signal supplying source in the disclosure is not limited to the electronic apparatus 100 or the broadcasting station. In other words, any apparatus, image source, or station capable of transmitting and receiving data may be included in the signal supplying source of the disclosure.

A signal received by the display apparatus 201 may be configured by various methods corresponding to apparatus types, and for example, an image signal may be received by wire based on a high definition multimedia interface (HDMI), composite video, component video, super video, Syndicat des Constructeurs d'Appareils Radiorécepteurs et Téléviseurs (SCART), and the other standards.

The display apparatus 201 may receive content from not just the electronic apparatus 100. For example, the display apparatus 201 may wirelessly receive a radio frequency (RF) signal, i.e. a broadcast signal from the broadcasting station. To this end, an antenna for receiving the broadcast signal and a tuner for being tuned to channels for the broadcast signal may be additionally provided in the display apparatus 201.

According to an embodiment, the display apparatus 201 provided as the external apparatus 200 may operate as a smart TV or Internet protocol (IP) TV. The smart TV refers to a TV that is capable of receiving and displaying a broadcast signal in real time, has a web browsing function so that various pieces of content can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of services, and may for example include applications for providing services such as social network service, finance, news, weather, map, music, movie, game, electronic book, etc.

According to an embodiment, as shown in FIG. 1, the external apparatus 200 includes a mobile apparatus 202 capable of wirelessly communicating with the electronic apparatus 100. According to an embodiment of the disclosure, the mobile apparatus 202 is realized by various mobile digital apparatuses, and may for example include an HMD apparatus, a smart watch and the like wearable apparatus that can be worn on a user's body as well as a smart phone, a tablet computer or the like smart pad, and a personal digital assistant (PDA). The HMD apparatus provides an environment for virtual reality (VR), mixed reality (MR) where a virtual object is mixed to the real world, or augmented reality (AR) to a user through a display thereof.

The mobile apparatus 202 may receive image content from various apparatuses such as the electronic apparatus 100 and a server through wireless communication. According to an embodiment of the disclosure, the mobile apparatus 202 may perform at least one of wireless communication using an access point (AP) or wireless communication for direct connection, such as point-to-point, with other apparatuses without using the AP.

FIG. 1 illustrates the display apparatus 201 and the mobile apparatus 202 as the examples of the external apparatus 200 for receiving image content from the electronic apparatus 100. In the embodiment of FIG. 1, the display apparatus 201 may receive the image content from the electronic apparatus 100 through a wired interface such as the HDMI, and the mobile apparatus 202 may receive the image content from the electronic apparatus 100 through wireless communication such as Wi-Fi or Wi-Fi direct. However, the types or quantities of the external apparatus 200 in the disclosure is not limited to that shown in FIG. 1. Alternatively, only either of the display apparatus 201 or the mobile apparatus 202 may be provided as the external apparatus 200, or two or more display apparatuses or two or more mobile apparatuses may be provided. Alternatively, the display apparatus 201 may receive the image content from the electronic apparatus 100 through the wired communication, or the mobile apparatus 202 may be connected to the electronic apparatus 100 through the wired interface and receive the image content.

One of major factors by which image quality of image content is determined is a contrast on a screen, and an image becomes sharper as gradation from the brightest portion (e.g. white) to the darkest portion (e.g. black) is more subdivided on one screen.

High dynamic range (HDR) content is displayed up to 1,000 nits of peak brightness, but standard dynamic range (SDR) content is displayed up to 100 nits of peak brightness. Such HDR or SDR content include content data corresponding to an image and may additionally include metadata, i.e. appended data related to the image attributes, e.g. the brightness of the content data.

The electronic apparatus 100 according to an embodiment of the disclosure is provided as an apparatus capable of transmitting an image signal corresponding to content of a first format to the external apparatus 200. For example, the content having the first format is the HDR content.

The external apparatus 200 controls a display to display the image signal corresponding to the content having the first format received from the electronic apparatus 100. Here, when the external apparatus 200 supports, i.e. is capable of processing (or decoding) the image signal corresponding to the content having the first format to be normally displayed, image content having improved image quality is provided to a user. On the other hand, when the external apparatus 200 does not support, i.e. is incapable of processing the image signal based on the content having the first format, an image may be displayed with distorted color and the like. The external apparatus may be capable or incapable of processing or decoding the image signal based on a hardware specification or capability thereof, a software specification or capability thereof, or a combination of hardware and software specifications and capabilities thereof.

Thus, the electronic apparatus 100 according to an embodiment of the disclosure converts the image signal corresponding to the content having the first format into an image signal corresponding to the content having a second format different from the first format, and transmits the converted image signal to the external apparatus 200. In this embodiment, the content having the second format is the SDR content, but not limited to the SDR content. For example, the content having the second format may be a low dynamic range (LDR) content.

The electronic apparatus 100 according to an embodiment of the disclosure performs conversion in such a manner that an image signal of certain content is subjected to down scaling for a lower version under a predetermined condition, and transmits the converted image signal to the external apparatus 200. For example, the electronic apparatus 100 may convert content based on a hardware specification or capability of the external apparatus 200, a software specification or capability of the external apparatus 200, or a combination of hardware and software specifications and capabilities of the external apparatus 200.

The conversion of the image signal includes conversion of the image signal with regard to attributes of the image signal. The attributes of the image signal to be converted may include a gamma characteristic (e.g. conversion from ST.2084 gamma into ST.1886 gamma), a color gamut characteristic (e.g. conversion from BT.2020 color gamut into BT.709 color gamut), etc.

According to an embodiment, the electronic apparatus 100 may convert the image signal corresponding to the content having the first format into the image signal corresponding to the content having the second format in accordance with whether a communicator (see '120' in FIG. 2) is activated, and transmits the converted image signal to at least one external apparatus 200.

According to another embodiment, the electronic apparatus 100 may determine whether the external apparatus 200 receiving an image signal supports processing for the image signal based on the content of the first format, convert the image signal corresponding to the content having the first format into the image signal corresponding to the content having the second format in accordance with determination results, and transmit the converted image signal to at least one external apparatus 200.

Specific operations of selectively converting and transmitting an image signal of content having a predetermined format under the conditions will be described in detail through the following embodiments. Below, terms 'content', 'image content' and 'content signal' are construed as meaning an image signal corresponding to the content, and operations of providing, transmitting, receiving, processing and converting the content are respectively construed as meaning operations of providing, transmitting, receiving, processing and converting the image signal corresponding to the content.

Below, elements of an electronic apparatus according to an embodiment of the disclosure and an external apparatus connected to the electronic apparatus by a wire or wirelessly will be described with reference to the accompanying drawings.

Figure 2:
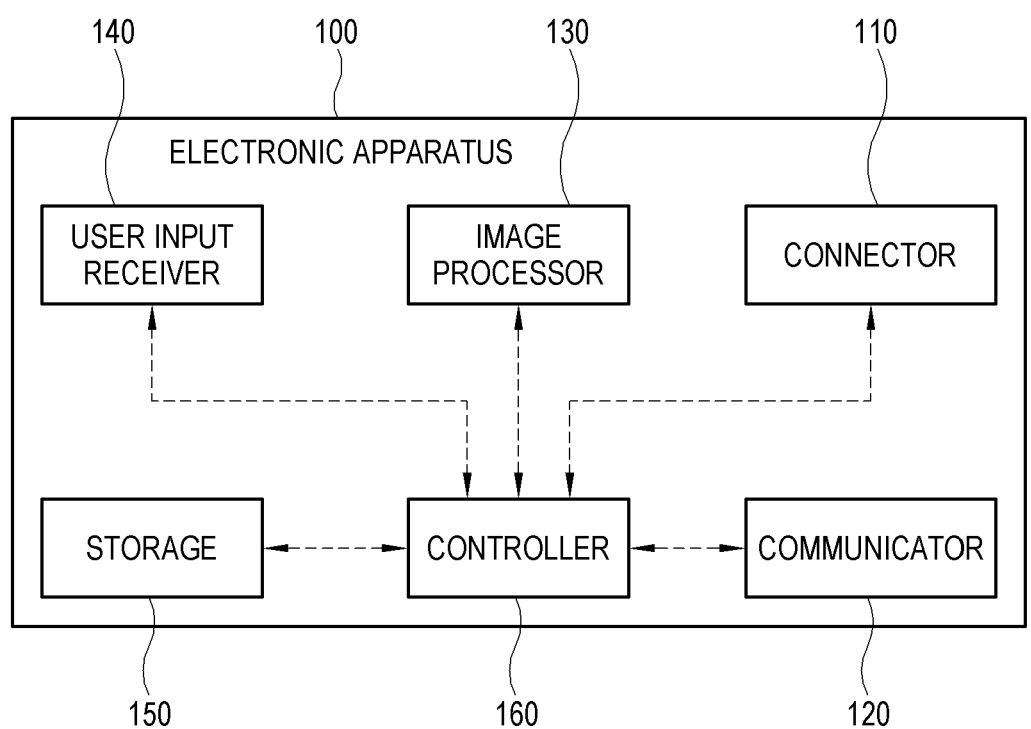
FIG. 2 is a block diagram that illustrates a configuration of an electronic apparatus according to an embodiment of the disclosure.

FIG. 2 is a block diagram that illustrates a configuration of an electronic apparatus according to an embodiment of the disclosure.

As shown in FIG. 2, the electronic apparatus 100 according to an embodiment of the disclosure includes a connector 110, a communicator 120, an image processor 130, a user input receiver 140, storage 150, and a controller 160.

The connector 110 is provided for wired connection between the electronic apparatus 100 and the external apparatus 200. The electronic apparatus 100 is connected to the connector 110 by a wire and transmits a content signal to the external apparatus 200 through the connector 110.

The connector 110 may be realized by a communication circuitry including a data input/output interface where ports and communication modules (e.g. an S/W module, a chip, etc.) corresponding to various kinds of communication protocols are combined. The connector 110 is configured to transmit a content signal to the external apparatus 200, but may be interactively configured to transmit and receive a signal.

According to an embodiment, the connector 110 and the external apparatus 200 are connected by an HDMI cable. However, a method for the connection is not limited to HDMI.

According to an embodiment, the external apparatus 200 connected to the electronic apparatus 100 by a wire through the connector 110 is the display apparatus 201 such as a TV. However, the disclosure is not limited to the display apparatus. For example, alternatively, the electronic apparatus 100 may be connected to the mobile apparatus 202 by a wire though the connector 110.

The communicator 120 performs wireless communication with at least one external apparatus 200. The electronic apparatus 100 may wirelessly transmit a content signal to the external apparatus 200 through the communicator 120.

The communicator 120 may be realized by a communication circuitry including wireless communication modules (e.g. an S/W module, a chip, etc.) corresponding to various kinds of communication protocols.

According to an embodiment, the communicator 120 includes a wireless local area network (WLAN) unit. The WLAN unit may be wirelessly connected to the external apparatus 200 through an AP under control of the controller 160. The WLAN unit includes a Wi-Fi or other wireless communication module.

According to an embodiment, the communicator 120 includes a local area communication module to support direct wireless communication between the electronic apparatus 100 and the external apparatus 200 without the AP. The local area communication module may be based on at least one of Wi-Fi Direct, Bluetooth, Bluetooth low energy, radio frequency (RF) communication, infrared data association (IrDA), ZigBee), ultrawideband (UWB), and near field communication (NFC). When the electronic apparatus 100 performs direct communication with the external apparatus 200, the storage 150 may be configured to store identification information (e.g. a media access control (MAC) address or an IP address) about the external apparatus 200 with which the communication is performed.

In the electronic apparatus 100 according to an embodiment of the disclosure, the communicator 120 is configured to perform wireless communication with the external apparatus 200 by at least one of the WLAN unit and the local area communication module according to performances.

Alternatively, the electronic apparatus 100 may further include a wired communication module such as Ethernet or Network Interface Card (NIC), etc. Alternatively, the communicator 120 may further include a communication module based on various communication methods such as long-term evolution (LTE) or the like mobile communication, electromagnetic (EM) communication including a magnetic field, visible light communication, acoustic wave communication, etc.

The image processor 130 performs various video/audio processing previously set to a content signal output through the connector 110 or the communicator 120. According to an embodiment, the image processor 130 is configured to process an image signal of the HDR content. However, the disclosure does not limit the kind of image content to be processed by the image processor 130.

Figure 3:
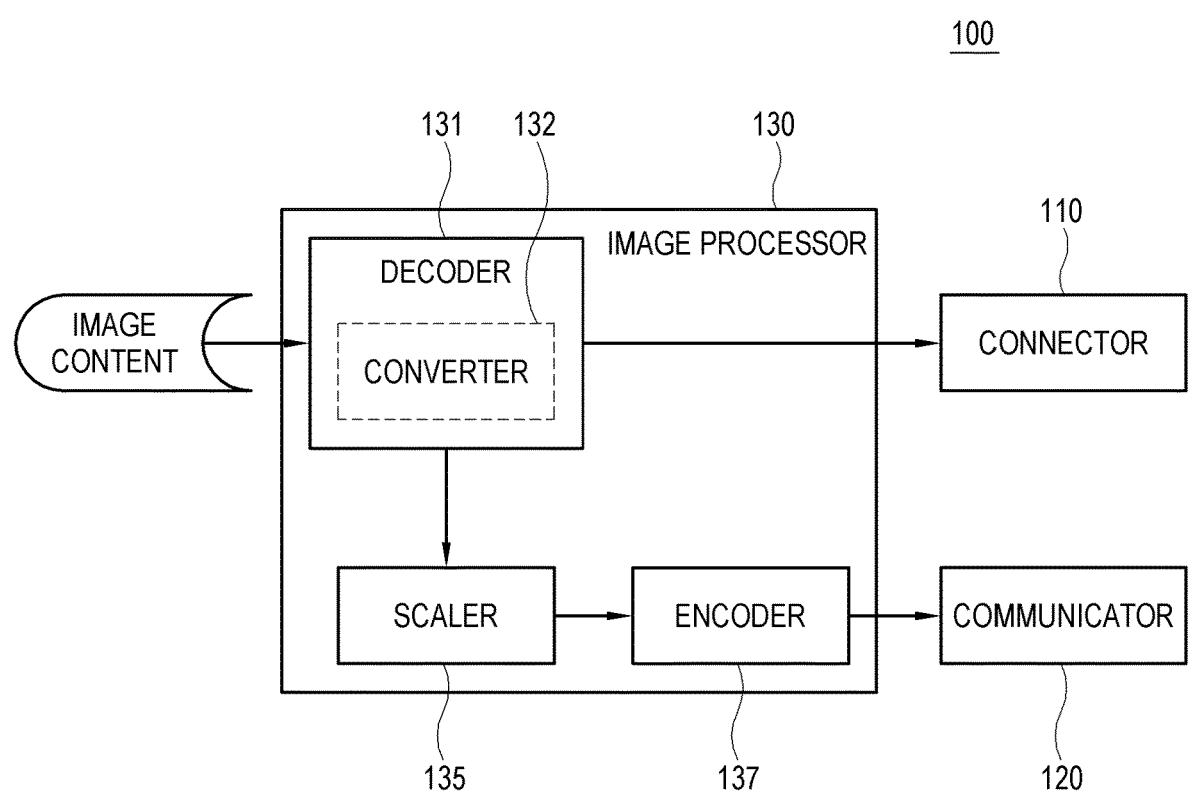
FIG. 3 is a block diagram that illustrates a configuration of an image processor provided in an electronic apparatus according to an embodiment of the disclosure.

FIG. 3 is a block diagram that illustrates a configuration of an image processor provided in an electronic apparatus according to an embodiment of the disclosure.

According to an embodiment, as shown in FIG. 3, the image processor 130 includes a decoder 131, a scaler 135, and an encoder 137. However, all the elements of the image processor 130 shown in FIG. 3 are not essential. In other words, the image processor 130 of the disclosure may further include another element in addition to those shown in FIG. 3, or may exclude at least some from those elements shown in FIG. 3, as necessary. Therefore, there are no limits to the kind of image processing processes performed in the image processor 130 of the disclosure. For example, at least one among various image processing such as a resolution conversion, color conversion, color space conversion, brightness change, noise reduction, detail enhancement, etc. is further performed, and the image processor 130 may be configured to include an element related to the processes. The image processor 130 may include a graphics processing unit (GPU).

The decoder 131 decodes content to obtain an image signal, i.e. audio and video signals. Decoding the image content may include decompressing the image content. When the image content is HDR content, meta data of the HDR content may be extracted during the decoding process. The decoder 131 is a high efficiency video coding (HVE) decoder capable of decoding the HDR content by way of example, but is not limited thereto.

According to an embodiment, the decoder 131 includes a converter 132 configured to convert the image signal corresponding to the decoded content having the first format into the image signal corresponding to the content having the second format. For example, the converter 132 may convert an image signal of HDR content into an image signal of SDR content. In the embodiment shown in FIG. 3, the converter 132 is realized as included in the decoder 131 by way of example. Alternatively, the converter 132 of the disclosure may be realized by a separate element for receiving a decompressed image signal from the decoder 131.

The decoder 131 processes the decoded image signal to be reproduced in the external apparatus 200, e.g. the display apparatus 201 connected through the connector 110. Here, the decoder 131 processes an image signal of SDR content, which is converted by the converter 132, to be reproduced in the display apparatus 201.

The image signal processed in the decoder 131 is provided to the external apparatus 200 connected by a wire through the connector 110.

The scaler 135 adjusts the image signal to match a display output size. According to an embodiment, the scaler 135 performs scaling so that the image signal of the image content converted to have the second format. The scalar may, for example, adjust the image signal such that SDR content can match the display output size of the external apparatus 200 to which the image signal will be output, e.g. the mobile apparatus 202. Here, the scaler 135 processes an image signal to be compatible with the external apparatus 200 which displays an image.

The encoder 137 compresses the image signal subjected to the scaling so that the image signal can be transmitted to the external apparatus 200. The encoder 137 may be an H.264/H.265 encoder, of which an error rate in network transmission is low and a compression efficiency is high, by way of example, but is not limited thereto.

The image signal compressed as described above by the encoder 137 is transmitted to the external apparatus 200 through the communicator 120. The external apparatus 200 includes a decoder, e.g. an H.264/H.265 decoder for decoding the compressed image signal, as an image processor 230 for processing an image based on the image signal to be output to the display 270.

The image processor 130 may be realized by a group of individual elements for independently performing such processes, or may be realized as included in a main system-on-chip (SoC) where many functions are integrated. The main SoC may include at least one micro-processor or central processing unit (CPU) or graphics processing unit (GPU) as an example of the controller 160.

According to an embodiment, the image processor 130 may be realized by a video board where various chipsets, a memory, electronic parts, wiring lines, and other circuit components for performing image processing are mounted on to a printed circuit board (PCB). In this case, the image processor 130 and the controller 160 of the electronic apparatus 100 may be provided in a single video board. Of course, this is merely an example, and alternatively the image processor 130 and the controller 160 may be arranged in a plurality of printed circuit boards connectable with each other.

The user input receiver 140 transmits various preset control commands or unrestricted information based on a user's input to the controller 160. The user input receiver 140 includes a keypad (or input panel) including a power key, a menu key, and the like buttons provided in a main body of the electronic apparatus 100.

According to an embodiment, the user input receiver 140 includes an input device that generates commands, data, information, and signals for remotely controlling the electronic apparatus 100 and transmits the commands, data, information, and signals to the electronic apparatus 100. The input device is provided separately from the main body of the electronic apparatus 100 similar to a conventional remote controller, and receives a user's input. The remote controller may include a touch sensor for sensing a user's touch input and/or a motion sensor such as a gyroscope for sensing motion of the user input receiver 140 caused by a user. The input device includes a terminal such as a smart phone in which a remote controller application is installed, and in this case a user's touch input can be made through a touch screen. According to an embodiment, the input device may be realized by a universal remote controller capable of controlling both the electronic apparatus 100 and the external apparatus 200.

The input device serves as an external apparatus that can perform wireless communication with the main body of the electronic apparatus 100. The wireless communication includes Bluetooth, infrared communication, RF communication, WLAN, Wi-Fi direct, etc.

According to an embodiment, the user input receiver 140 may further include a sound receiver for receiving a voice and sound in the form of speech uttered by a user. The sound receiver may be realized by a microphone for receiving a sound signal, and may be installed in the main body of the electronic apparatus 100, the remote controller, or the like.

The storage 150 may be configured to store various pieces of data of the electronic apparatus 100. The storage 150 may be realized by a nonvolatile memory or a writable read only memory (ROM), which can retain data even though the electronic apparatus 100 is powered off. That is, the storage 150 may be provided as at least one among a flash memory, electrically programmable ROM (EPROM) or electrically erasable and programmable ROM (EEPROM). The storage 150 may further include a volatile memory, such as a dynamic random-access memory (DRAM) or static RAM (SRAM), of which reading or writing speed is faster than the nonvolatile memory.

Data stored in the storage 150 may for example include an operating system for driving the electronic apparatus 100 and also various applications executable on the operating system, image data, appended data, etc.

According to an embodiment, the storage 150 includes an optical disc storage medium such as a BD, a DVD, etc. in which image content is stored. There are no limits to the kinds of content to be recorded in the optical disc storage medium, and the optical disc storage medium may for example include an ultra-high definition (UHD) BD. The electronic apparatus 100 is provided with a disc loader or reader to read the stored data by rotating an optical disc when the reproduction of the content is requested, and reads digital content from a rotating disc, i.e. an UHD BD, a BD, a DVD, etc. by using a laser.

The controller 160 performs control for operating elements of the electronic apparatus 100. The controller 160 may include a control program (or instruction) configured to perform such a control operation, a nonvolatile memory in which the control program is installed, a volatile memory in which at least a part of the installed control program is loaded, and at least one processor or CPU configured to execute the loaded control program.

The processor may include a single core, a dual core, a triple core, a quad core, and any multiple core configuration. The processor may include a plurality of processors, for example, a main processor and a sub processor that operates in a sleep mode (during which only standby power is supplied without operations of a content providing apparatus). Further, the processor, the ROM, and the RAM may be connected to one another through one or more internal busses. According to an embodiment, the processor may be realized in the form of the system on chip (SoC) in which the core and the GPU are combined.

In the disclosure, the processor given as an example of the controller 160 may be realized as included in the main SoC mounted to the PCB internally provided in the electronic apparatus 100. Alternatively, the main SoC may further include the image processor 130.

The control program may include a program(s) achieved by at least one of a basic input/output system (BIOS), a device driver, an operating system, a firmware, a platform, or an application. According to an embodiment, the application may be installed or stored in the electronic apparatus 100 by a manufacturer, or may be installed in the electronic apparatus 100 on the basis of application data received from another source by an end user of the device. The application data may for example be downloaded from an external server to the electronic apparatus 100. Such an external server is merely an example of a source of application data according to the disclosure, but not limited thereto.

According to an embodiment, the foregoing operations of the controller 160 may be realized by a computer program stored in the computer program product provided separately from the electronic apparatus 100. In this case, the computer program product includes a memory in which an instruction corresponding to a computer program is stored. The instruction includes converting the image signal corresponding to the content having the first format into the image signal corresponding to the content having the second format, and transmitting the converted image signal to at least one external apparatus 200 when the instruction is executed by the processor.

Accordingly, the electronic apparatus 100 downloads and executes the computer program stored in a separate computer program product and performs the operations of the controller 160.

The controller 160 controls the image processor 130 to convert the image signal corresponding to the content having the first format to correspond to the content having the second format different from the first format.

The controller 160 transmits the image signal corresponding to the content having the second format, which is converted by the image processor 130, to the external apparatus 200 through the connector 110 or the communicator 120. Here, a plurality of external apparatuses 200 may be provided and each connected by a wire or wirelessly through either of the connector 110 or the communicator 120.

According to the embodiments, the electronic apparatus 100 may transmit the image signal corresponding to the content having the second format to each of the plurality of external apparatuses connected through the connector 110 and the communicator 120, or transmit the image signal corresponding to the content having the first format to one external apparatus (e.g. the external apparatus connected through the connector 110) and the image signal corresponding to the content having the second format to another external apparatus (e.g. the external apparatus connected through the communicator 120) as necessary.

According to an embodiment, when the communicator 120 for wireless communication is activated under the condition that the electronic apparatus 100 is connected to the plurality of external apparatuses by a wire or wirelessly, the converted image signal corresponding to the content having the second format may be transmitted to all the apparatuses connected by a wire or wirelessly.

Alternatively, based on determining that the wirelessly connected apparatus does not support the processing of the image signal corresponding to the image content having the first format under the condition that the electronic apparatus 100 is connected to the plurality of external apparatuses by a wire or wirelessly, the converted image signal corresponding to the content having the second format may be transmitted to all the apparatuses connected by a wire or wirelessly.

With this, image distortion is prevented in the external apparatus that does not support the image content having the first format, and the corresponding image content is readily displayed through not only the wirelessly-connected external apparatus but also the wired-connected display apparatus.

Figure 4:
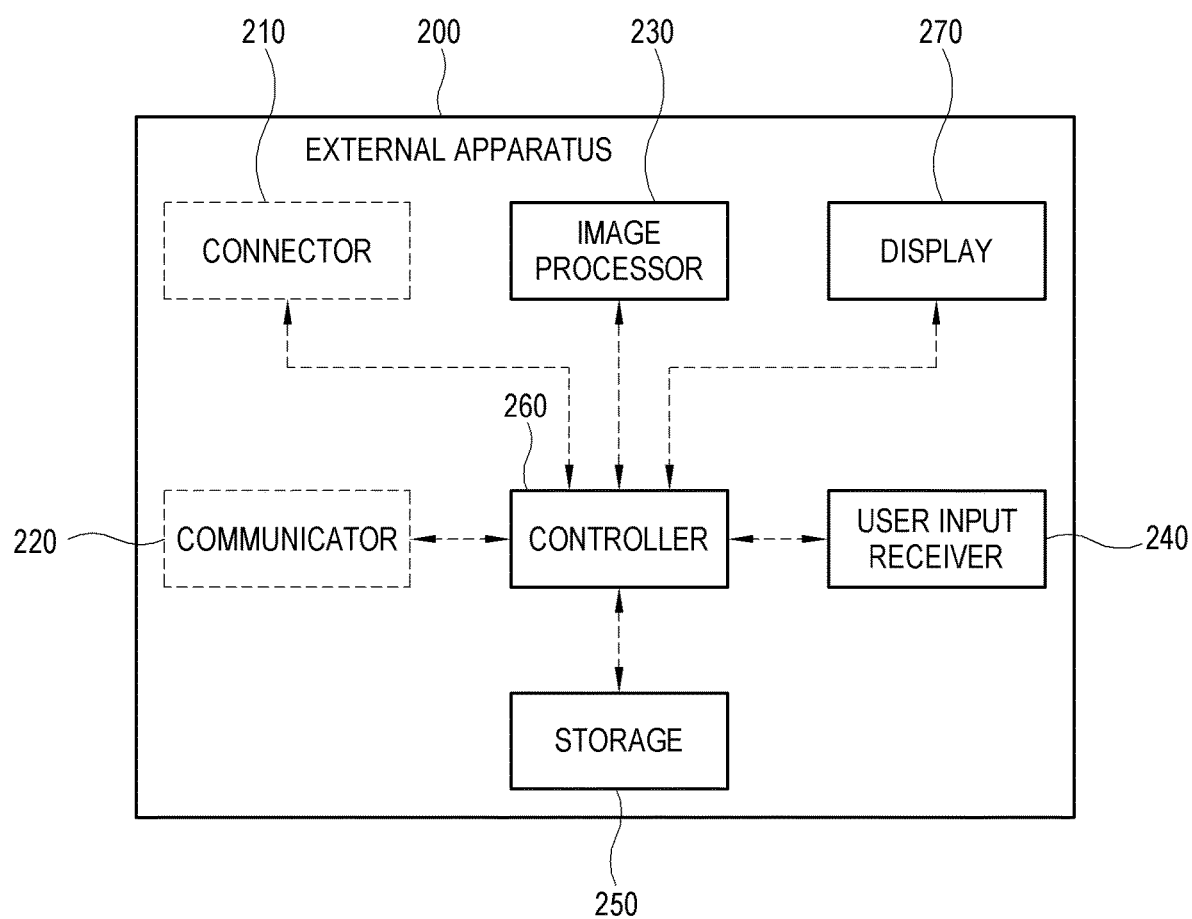
FIG. 4 is a block diagram that illustrates a configuration of an external apparatus according to an embodiment of the disclosure.

FIG. 4 is a block diagram that illustrates a configuration of an external apparatus according to an embodiment of the disclosure.

The external apparatus 200 receives the image content provided from the electronic apparatus 100, as described above, and processes the received image content to be displayed on the display 270 thereof.

According to an embodiment of the disclosure, there may be provided a plurality of external apparatuses 200. For example, as shown in FIG. 1, a TV or the like display apparatus 201 and a smart phone or the like mobile apparatus 202 are provided to receive the image content from the electronic apparatus 100. Alternatively, the mobile apparatus 202 may be a wearable apparatus such as an HMD apparatus. The configuration shown in FIG. 4 is applicable to both the display apparatus 201 and the mobile apparatus 202. However, according to the characteristics of the apparatus, elements may be added or excluded, or a specific element may be differently realized.

There are no limits to the display 270 provided in the external apparatus 200. For example, the display 270 may be realized by various display types such as liquid crystal, plasma, a light-emitting diode, an organic light-emitting diode, a surface-conduction electron-emitter, a carbon nano-tube, nano-crystal, etc. The display may further include an additional element (e.g. a driver) according to the type of display.

According to an embodiment, the display 270 is realized by a touch screen for sensing a user's touch input. The touch input may include various gestures or motion inputs such as a single touch, multi touches, a tap, a click, dragging in a certain direction, a flick, etc.

The touch screen includes a touch pad placed on the top of a panel under which an image is displayed, and a user interface (UI, hereinafter also referred to as a graphic user interface (GUI)) selectable by a user is displayed on the touch screen. The touch pad and the UI are included in the user input receiver 240.

The UI may include various objects (e.g. a menu, a text, a still image, a moving image, a figure, an icon, and shortcut icon) including the menu items of the external apparatus 200, and a user may make an input by touching the displayed object with an object (e.g. a finger), a stylus, or another separate pointing device.

The UI may be displayed on the display 270 even when the display 270 is not realized by the touch screen, and a user may make selection on the UI through the user input receiver 240 such as a remote controller, an input panel, etc.

According to an embodiment, the UI displayed on the display 270 of the external apparatus 200 includes menu items related to the electronic apparatus 100 connected by a wire or wirelessly. In this case, a user can set or control the external apparatus 200 through the remote controller or the like provided as the user input receiver 140 of the electronic apparatus 100.

When the external apparatus 200 is an HMD apparatus, the display 270 is realized by a transparent or translucent display panel placed in front of eyes of a user, i.e. a viewer. According to an embodiment, the HMD apparatus may be realized by an ocular display apparatus placed near a user's eyes. The ocular display apparatus may include two displays corresponding to two eyes of a user, and the two displays may display one image or different images. Further, the HMD apparatus may display an image in response to a user's motion. A user may move the user's body or only a head, and in this case the HMD apparatus displays an image varied depending on the user's motion.

The external apparatus 200 according to an embodiment of the disclosure includes a connector 210, a communicator 220, an image processor 230, the user input receiver 240, a storage 250, and a controller 260 as shown in FIG. 4 in addition to the display 270. However, all these elements are not essential, and thus the external apparatus 200 may be realized without at least some among the foregoing elements. For example, according to an embodiment, the external apparatus 200 may include only one of the connector 210 and the communicator 220. Further, the external apparatus 200 may further include another element, for example, a tuner to be tuned to a channel for a broadcast signal, in addition to the foregoing elements.

According to an embodiment of the disclosure, the storage 250 of the external apparatus 200 may be configured to store various pieces of information of the external apparatus 200.

According to an embodiment, the storage 250 is provided with an extended display identification data (EDID) area in which EDID is stored. The EDID area is realized by an EEPROM provided corresponding to the connector 210, e.g. an HDMI interface of the external apparatus 200, and the EDID may be written in the EEPROM when the external apparatus 200 is manufactured or a program/application is installed or executed in the external apparatus 200.

The electronic apparatus 100 receives EDID, i.e. a package of information about a support resolution, a horizontal frequency, a vertical frequency, a color gamut, an expressible brightness range, etc. from the external apparatus 200, and determines a range of image content expressible in the external apparatus 200. As a protocol for transmitting the EDID, there is a display data channel (DDC) transmission method specified by video electronics standards association (VESA).

According to an embodiment, the external apparatus 200 may have a plurality of ports as the connector 210, and each port may be provided with an EEPROM in which corresponding EDID is stored. When the electronic apparatus 100 and the external apparatus 200 are connected through their respective connectors 110 and 210 and then an EDID request signal from the electronic apparatus 100 is transmitted to the external apparatus 200, the EDID is loaded from the EEPROM of the corresponding port and transmitted to the electronic apparatus 100 via both the connectors 210 and 110. Here, the controller 160 of the electronic apparatus 100 applies a hot plug detection signal to the connector 110, i.e. an HDMI interface, so that the EDID request signal can be transmitted to the external apparatus 200, thereby reading necessary information.

Meanwhile, according to an embodiment of the disclosure, the electronic apparatus 100 may further receive data about an expression range of an image from the external apparatus 200 (e.g. the mobile apparatus 202 of FIG. 1) connected wirelessly through the communicator 120. The external apparatus 200 may store the data about the expression range of the image in the storage 250, in which the data may be stored in the same form as the EDID corresponding to the connector 210 but is not limited thereto.

As described above, the elements provided in the external apparatus 200 are realized corresponding to those defined by the same terms in the electronic apparatus 100. Therefore, the elements having the same functions as those of the electronic apparatus 100 will be given the same names as those of the electronic apparatus 100, and detailed descriptions thereof will be omitted to avoid repetitive descriptions.

According to an embodiment of the disclosure, the electronic apparatus 100 realized by a BD player or the like optical disc player is configured to support a so-called BD-to-mobile function of transmitting image content to the wirelessly connected external apparatus 200, i.e. the mobile apparatus 202.

Figure 5:
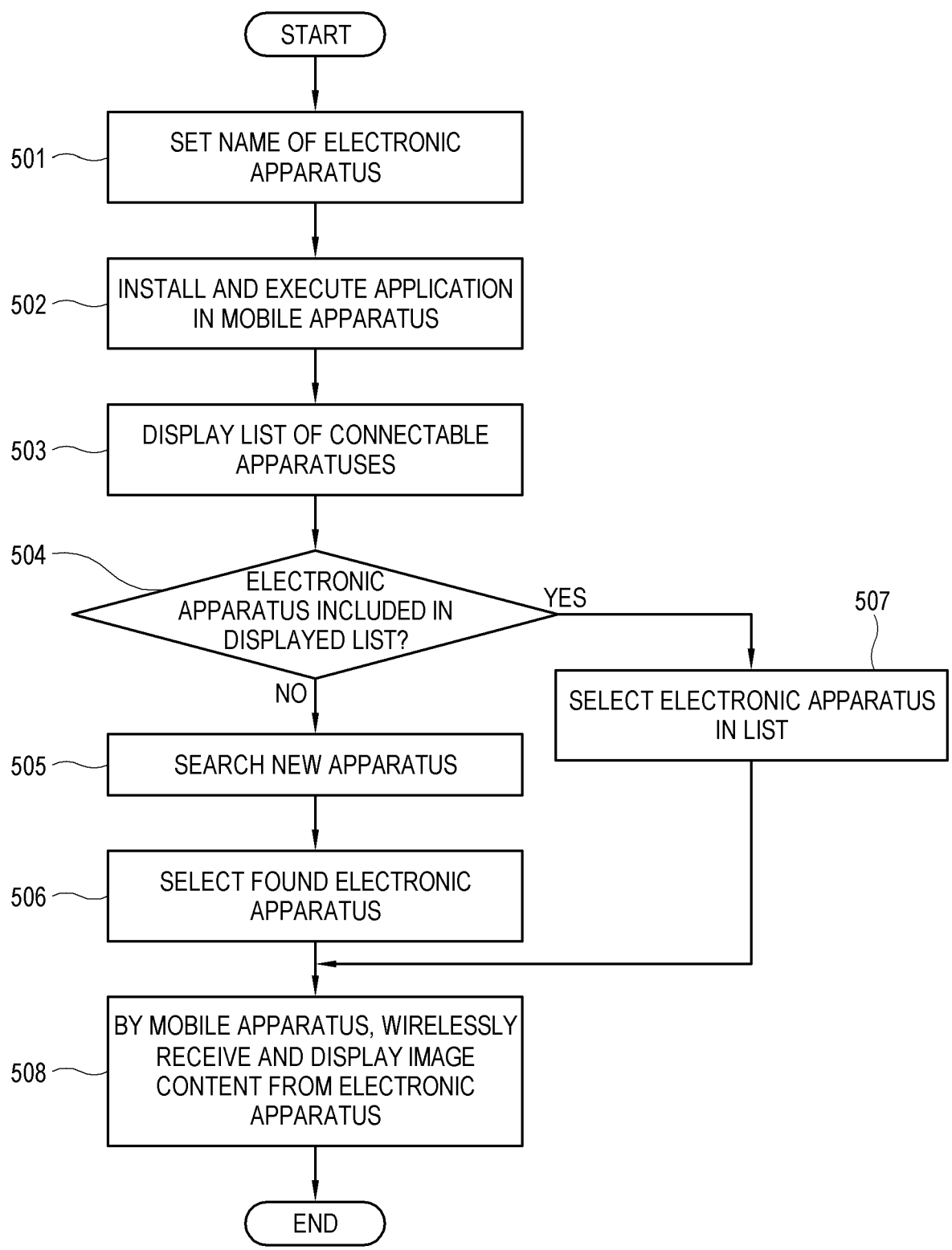
FIG. 5 is a flowchart that illustrates a method of wirelessly transmitting image content from an electronic apparatus to an external apparatus according to an embodiment of the disclosure.
Figure 6:
FIG. 6 is a diagram that illustrates wirelessly transmitting image content from an electronic apparatus to an external apparatus according to an embodiment of the disclosure.

FIG. 5 is a flowchart that illustrates a method of wirelessly transmitting image content from an electronic apparatus to an external apparatus according to an embodiment, and FIG. 6 is a diagram that illustrates wirelessly transmitting image content from an electronic apparatus to an external apparatus according to an embodiment.

As shown in FIG. 5, a user enters a set menu for the electronic apparatus 100 and sets the name of the electronic apparatus 100 (501). According to an embodiment, the set menu for the electronic apparatus 100 may be displayed on the display 270 of the display apparatus 201 connected by a wire through the connector 110, and a user may set the name of the electronic apparatus 100 by using the user input receiver 140 such as a remote controller, an input panel, etc. The name of the electronic apparatus 100 may be set with a product name or by selection/input so as to be identifiable by a user. As necessary, the operation 501 of setting the name may be omitted.

A user may install and execute a predetermined application for wireless connection in the mobile apparatus 202 (502). When this application has been installed at a manufacturing stage or otherwise previously installed before use by the user, the previously installed application may be executed by selection of a user without the operation of installing the application.

In response to execution of the application for the wireless connection, the display 270 of the mobile apparatus 202 displays a list of apparatuses connectable with the mobile apparatus 202 (503). Here, the displayed list includes apparatuses that have been previously connected to the mobile apparatus 200.

Then, a subsequent operation is determined according to whether the electronic apparatus 100 is included in the list displayed in the operation 503 (504).

When it is determined in the operation 504 that the electronic apparatus 100 is not included in the displayed list, a user makes selection to search for a new wirelessly-connectable apparatus (505).

Then, the found electronic apparatus 100 is selected as an object for the wireless connection (506). Here, a user can identify the electronic apparatus 100 through the names set in the operation 501. With this selection, the electronic apparatus 100 is registered as a new connection apparatus.

On the other hand, based on determining in the operation 504 that the electronic apparatus 100 is included in the displayed list, a user selects the electronic apparatus 100 in the list as the object for the wireless connection (507).

In response to the selection in the operation 506 or 507, the wireless connection between the electronic apparatus 100 and the mobile apparatus 202 is established, and as shown in FIG. 6 the mobile apparatus 202 wirelessly receives image content from the electronic apparatus 100 and displays the image content (508).

Below, embodiments of providing image content to the mobile apparatus 202 wirelessly connected to the electronic apparatus 100, as described above, i.e. to the external apparatus 200, will be described.

Figure 7:
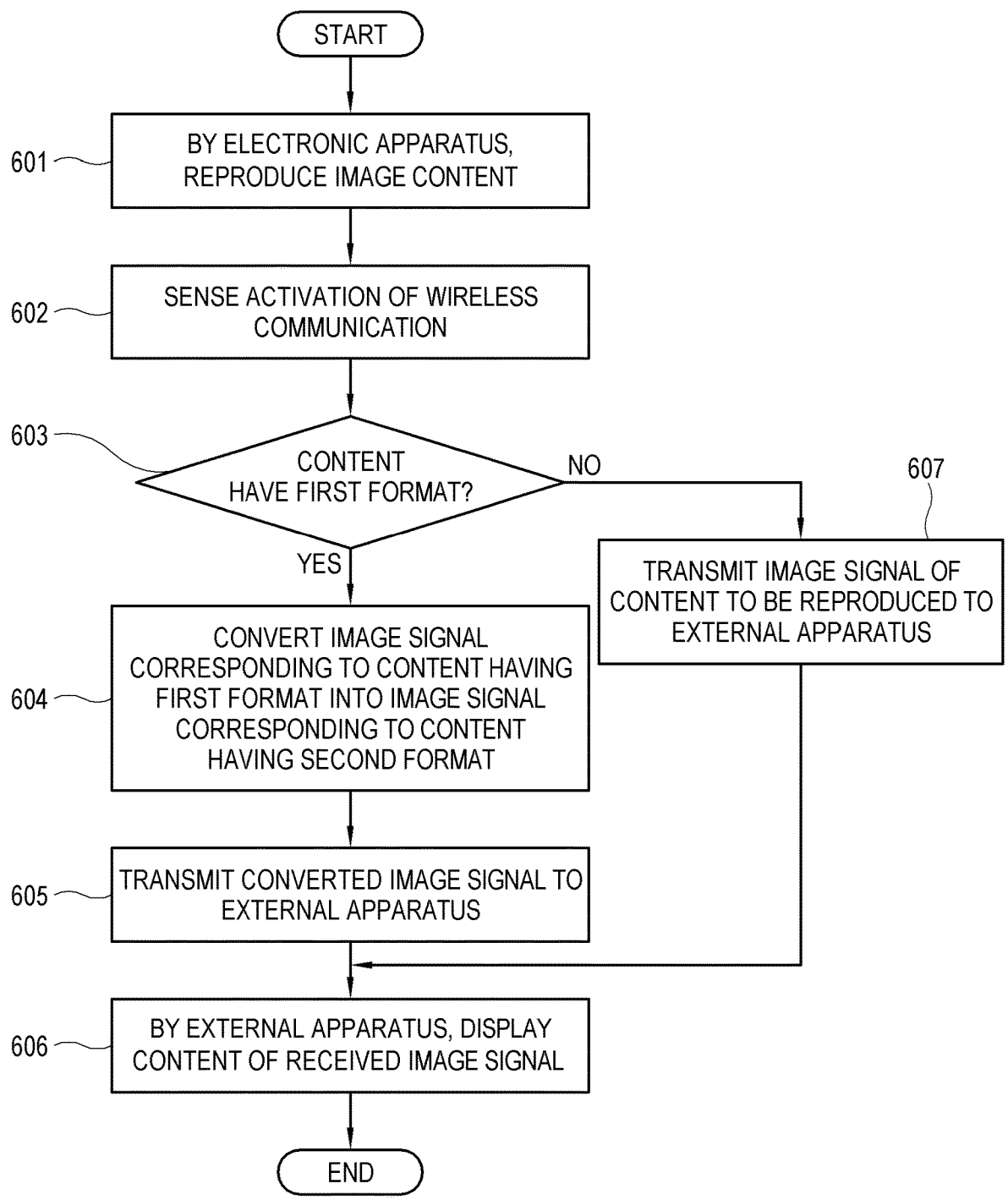
FIG. 7 is a flowchart that illustrates a method of controlling an electronic apparatus according to an embodiment of the disclosure.
Figure 8:
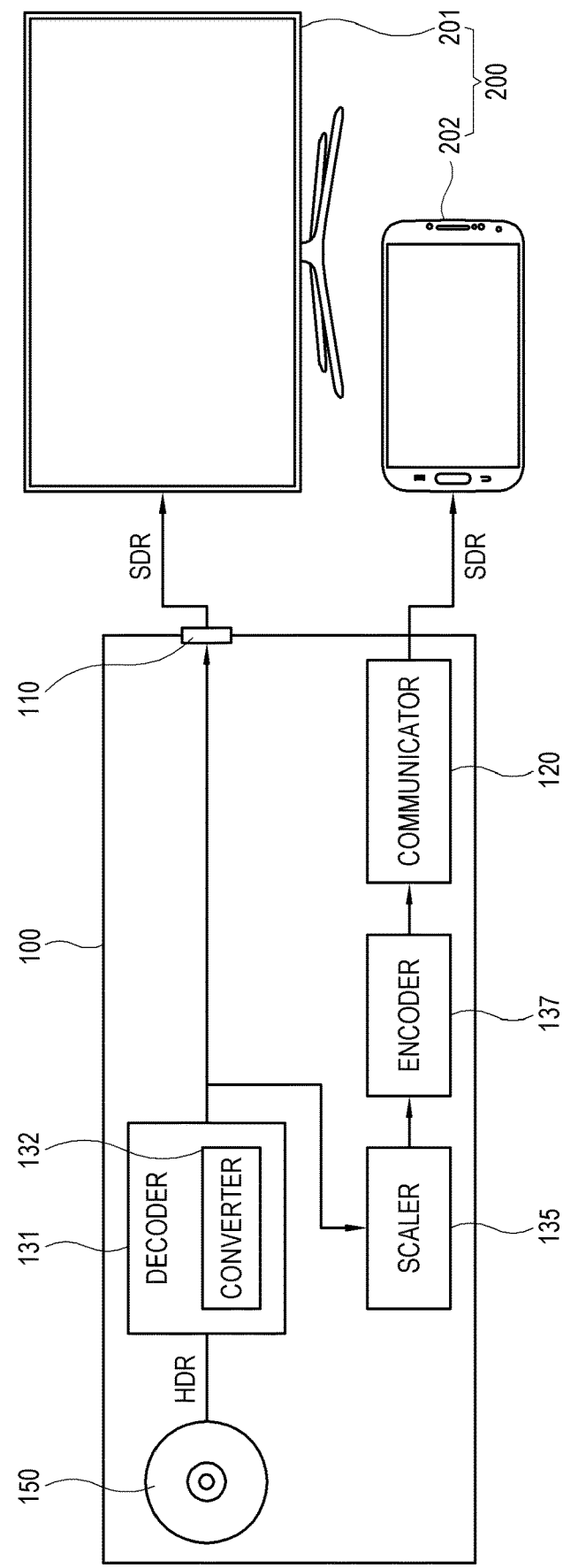
FIG. 8 is a diagram that illustrates providing image content to a plurality of external apparatuses according to an embodiment of the disclosure.

FIG. 7 is a flowchart that illustrates a method of controlling an electronic apparatus according to an embodiment of the disclosure, and FIG. 8 is a diagram that illustrates providing image content to a plurality of external apparatuses according to an embodiment of the disclosure.

As shown in FIG. 7, a command issued to reproduce image content is received in the electronic apparatus 100 (601). Here, the controller 160 of the electronic apparatus 100 may receive a content reproduction command through the remote controller provided as the user input receiver 140, and this received content reproduction command may include a command for making the display apparatus 201 connected through the connector 110 as shown in FIG. 8 output the reproduced content to the electronic apparatus 100. For example, the image content to be reproduced is provided as stored in the storage 150 such as a BD or the like optical disc.

In relation to the reproduction of the image content in the operation 601, the controller 160 senses whether the communicator 120 for wireless communication is activated (602). Here, the controller 160 senses whether the communicator is activated, in response to a predetermined event that wireless communication connection with or setting for the connection with a specific external apparatus 200 is made, a setting is made to transmit the image content to a specific external apparatus 200 through the wireless communication, or etc. For example, the controller 160 senses that the wireless communication is activated, when an application for the wireless communication (e.g. a BD-to-mobile App) as described in the embodiment of FIG. 5 is executed in a predetermined external apparatus 200, i.e. the mobile apparatus 202 of FIG. 8 and establishes a wireless connection between the electronic apparatus 100 and the external apparatus 200 (i.e. the mobile apparatus 202 of FIG. 8). The event of activating the communicator 110 includes a user's input.

According to an embodiment, the controller 160 of the electronic apparatus 100 may sense that the communicator 120 is activated, while the image signal is transmitted to the display apparatus 201 and the corresponding content is reproduced in the display apparatus 201 in response to the reproduction command of the operation 601. When it is sensed that the communicator 120 is activated, the controller 160 may allow a user to provide an input for selecting whether the image content will be output through both the wire-connected connector 110 and the wireless-connected communicator 120 or through only one of the connector 110 and the communicator 120. A UI for a user's selection is displayed on at least one of the external apparatuses 200, i.e. the display apparatus 201 and the mobile apparatus 202, and allows the user to input the selection. In response to a user's selection through the interface output as described above, the electronic apparatus 100 provides the image content having the first format or the image content having the second format to the external apparatus 200.

Alternatively, the controller 160 of the electronic apparatus 100 may sense that the communicator 120 is activated, while the display apparatus 201 reproduces no images. In other words, as necessary, the operation 602 may first be performed to activate the communicator 120 in the electronic apparatus 100, and the operation 601 may be then performed to receive a command for reproducing the image content.

When it is sensed in the operation 602 that the wireless communication is activated, the controller 160 determines whether the image content to be reproduced is the content having the first format (603). Here, the image content having the first format may be the HDR content by way of example, and the controller 160 may determine the format of the image content based on metadata of the content decoded by the decoder 131.

When it is determined in operation 603 that the image content to be reproduced is the content having the first format, the controller 160 controls the image processor 130 to convert the image signal corresponding to the content having the first format into the image signal corresponding to the content having the second format different from the first format (for example, SDR or LDR content) (604). Specifically, as shown in FIG. 8, the controller 160 controls the image signal corresponding to the content having the first format to be converted corresponding to the content having the second format through the converter 132. The converted image signal corresponding to the content having the second format is subjected to the scaler 135 and the encoder 137 and output as an encoded image signal to the communicator 120.

The image signal converted in operation 604 to correspond to the content having the second format is transmitted to the external apparatus 200 (605). Specifically, the controller 160 controls the communicator 120 to transmit the image signal corresponding to the content having the second format to the corresponding external apparatus 200 based on the wireless communication, i.e. the mobile apparatus 202 of FIG. 8.

Here, the controller 160 may further transmit the image signal corresponding to the content having the second format to the external apparatus 200 through the connector 110, i.e. the display apparatus 201 of FIG. 8. Further, according to an embodiment, based on sensing in operation 602 that the wireless communication is activated, e.g. the communicator 120 is used for the connection with the mobile apparatus 202 while the image signal corresponding to the content having the first format is transmitted to the display apparatus 201, the controller 160 transmits the image signal converted to correspond to the content having the second format to the display apparatus 201 through the connector 210 after sensing the activation of the wireless communication.

The external apparatus 200, i.e. the mobile apparatus 202 or the display apparatus 201, receives the image signal corresponding to the content having the second format transmitted in the operation 605, and displays the content based on the received image signal on a display 370 (606). Thus, image distortion does not occur because the content having the second format, i.e. the SDR content is received and displayed in the external apparatus 200 that wirelessly connects with the electronic apparatus 100 and does not support the first format of the content (e.g. the mobile apparatus 202 of FIG. 8).

When it is determined in the operation 603 that the content to be reproduced is not the content having the first format, the controller 160 transmits the image signal of the content to be reproduced to the external apparatus 200 without conversion (607). In other words, the controller 160 controls the communicator 120 to transmit the image signal to the external apparatus 200 corresponding to the wireless communication, i.e. the mobile apparatus 202 of FIG. 8. Here, the controller 160 may further transmit the content to be reproduced to the external apparatus 200 corresponding to the connector 110, i.e. the display apparatus 201 of FIG. 8.

The external apparatus 200, i.e. the mobile apparatus 202 or the display apparatus 201 receives the image signal transmitted in the operation 607, and displays the content corresponding to the received image signal on the display 370 (606).

In the embodiment, the electronic apparatus 100 may provide the image content to the external apparatus 200 wirelessly connected through the communicator 120 (e.g. the mobile apparatus 202 of FIG. 8) and also the external apparatus 200 connected by a wire through the connector 110 (e.g. the display apparatus 201 of FIG. 8). Specifically, the image signal converted to correspond to the content having the second format by the converter 132 in the image processor 130 is transmitted to the display apparatus 201 through the connector 110, and the display apparatus 201 displays the content corresponding to the received image signal on the display 370.

According to the embodiment, in the electronic apparatus 100 having the connector 110 for the wired connection and the communicator 120 for the wireless communication, the controller 160 converts the image signal corresponding to the content having the first format into the image signal corresponding to the content having the second format upon determining that the wireless communication using the communicator 120 is activated, and controls the converted image signal corresponding to the content having the second format to at least one external apparatus 200. In other words, the electronic apparatus 100 may transmit the image signal converted to correspond to the content having the second format to the wirelessly connected mobile apparatus 202 or may transmit the image signal converted to correspond to the content having the second format to both the wire-connected display apparatus 201 and the wireless-connected mobile apparatus 202.

Therefore, the image content from the electronic apparatus 100 having the single image processor 130 is simultaneously provided to the plurality of external apparatuses 200, but image distortion does not occur in any apparatus that outputs the image content.

Figure 9:
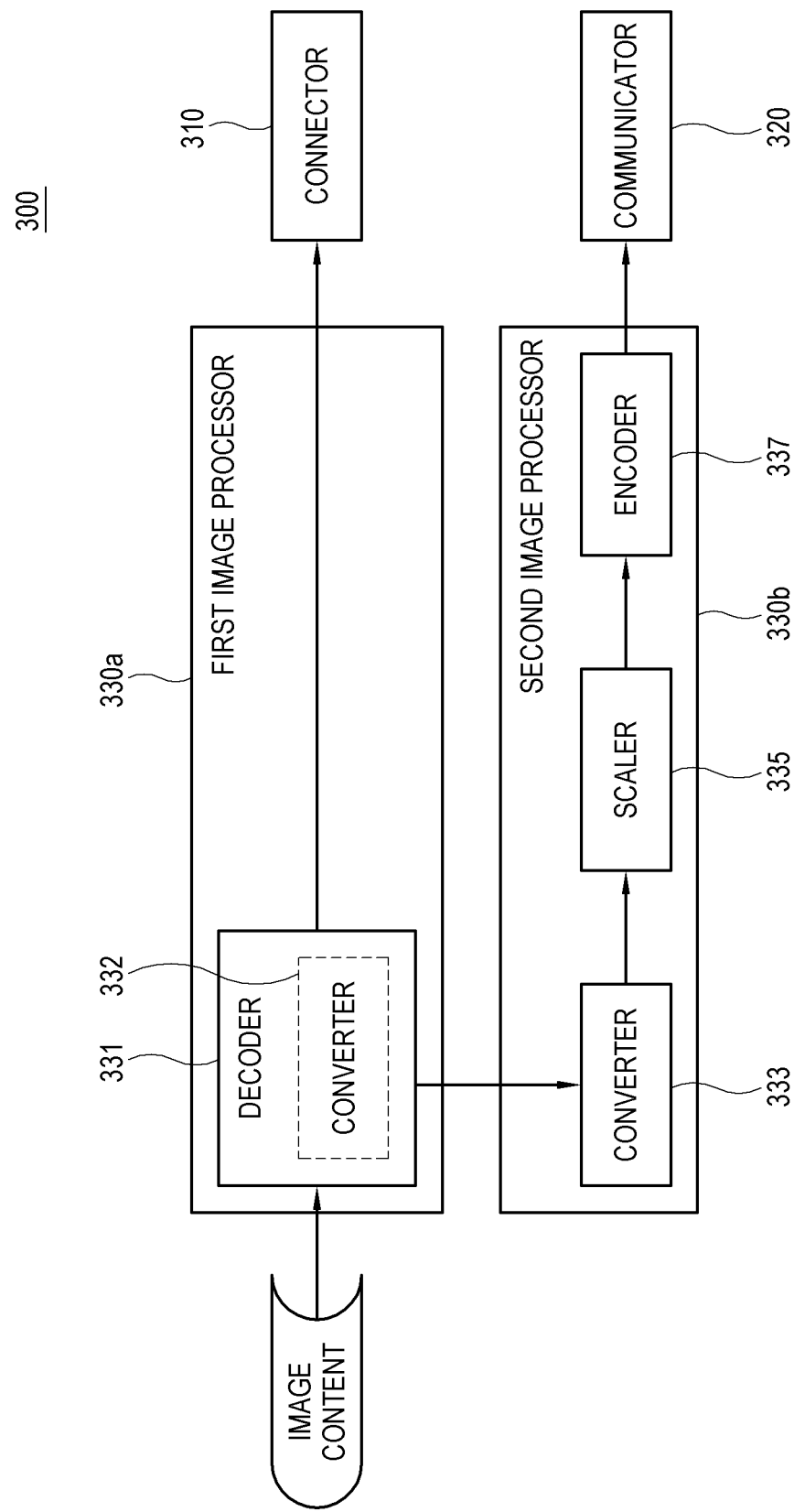
FIG. 9 is a block diagram that illustrates a configuration of an image processor provided in an electronic apparatus according to an embodiment of the disclosure.

FIG. 9 is a block diagram that illustrates a configuration of an image processor provided in an electronic apparatus according to an embodiment of the disclosure.

An electronic apparatus 300 according to this embodiment shown in FIG. 9 includes a plurality of image processors, i.e. a first image processor 330a and a second image processor 330b, which is contrary to the electronic apparatus 100 according to the foregoing embodiment described with reference to FIGS. 2 and 3. Therefore, the same terms and reference numerals as those of FIGS. 2 and 3 will be given to the other elements except the first and second image processors 330a and 330b and a connector 310 and a communicator 320 connecting with the first and second image processors 330a and 330b, and detailed descriptions thereof will be omitted to avoid repetitive descriptions.

As shown in FIG. 9, the electronic apparatus 300 in this embodiment includes the first image processor 330a corresponding to the connector 310 for the wired connection with the external apparatus 200, and the second image processor 330b corresponding to the communicator 320 for the wireless communication with the external apparatus 200.

The first image processor 330a includes a decoder 331 for decoding and decompressing image content. The decoder 331 is an HVEC decoder capable of decoding HDR content by way of example, but is not limited thereto.

According to an embodiment, the decoder 331 includes a converter 332 to convert a decoded image signal corresponding to content having a first format into an image signal corresponding to content having a second format. For example, the converter 332 may convert an image signal of HDR content into an image signal of SDR content. The embodiment shown in FIG. 9 shows an example that the converter 332 is included in the decoder 331, but the converter 332 of the disclosure may be provided in the first image processor 330a as a separate element for receiving a decompressed image signal from the decoder 331.

The controller 160 determines whether the external apparatus 200 connected through the connector 310 supports the content having the first format. Here, determination of whether the content having the first format is supported includes determining whether the ranges based on the format of the content are normally expressible when the image signal corresponding to the content having the first format is processed and displayed as an image in the external apparatus 200. Based on determining that the external apparatus 200 does not support the content having the first format, the image signal is converted to correspond to the content having the second format by the converter 332 of the first image processor 330a and output to the connector 310. On the other hand, based on determining that the external apparatus 200 supports the content having the first format, the image signal corresponding to the content having the first format is output through the connector 310. The determination of whether the content having the first format is supported is realized by using the EDID in the storage 250 of the external apparatus 200 connected to the connector 310.

Specifically, the controller 160 loads the EDID from the EDID area of the storage 250 of the external apparatus 200 connected by a wire through the connector 310, for example, the display apparatus 201 of FIG. 8, obtains information about the display apparatus 201, and determines whether the display apparatus 201 supports the content of the first format on the basis of the obtained information. Such determination is determining whether the display apparatus 201 can receive the image signal corresponding to the content having the first format through an input terminal. Here, the information obtained by loading the EDID includes information about the specifications of the display apparatus 201. Further, there are no limits to points in time when the EDID is loaded, and the points in time for loading the EDID include a point in time when the electronic apparatus 300 and the external apparatus 200 are connected for the first time, a point in time when a command is issued to reproduce the image content, a point in time when a signal having a predetermined level is applied to the connector 310, etc. The signal applied to the connector 310 is a hot plug signal applied at HDMI connection by way of example. For example, the EDID may be loaded at a point in time when a signal is changed from low (0V) to high (+5V) at an HDMI pin-19.

The second image processor 330b includes a converter 333 to receive a decompressed signal from the decoder 331. FIG. 9 shows an embodiment that the signal is transmitted from the decoder of the first image processor 330a to the converter 333 of the second image processor 330b by way of example, but the disclosure is not limited to this embodiment. Alternatively, the decoder for decoding the compressed image content may be further provided in the second image processor 330b. The converter 333 converts the decoded image content having the first format into the image content having the second format. For example, the converter 333 may convert the HDR content into SDR content.

A scaler 335 adjusts the image signal to match a display output size. According to an embodiment, the scaler 335 may perform scaling so that the image content converted to have the second format, i.e. the SDR content can match the display output size of the external apparatus 200 to which the image signal will be output, e.g. the mobile apparatus 202. An encoder 337 compresses the image signal subjected to the scaling so that the image signal can be transmitted to the external apparatus 200. The encoder 337 may be an H.264 encoder, of which an error rate in network transmission is low and a compression efficiency is high, by way of example, but is not limited thereto. For example, H.265 as a more advanced encoding scheme than H.264 may be applied to the encoder 337, and a format related to a plurality of codecs may be applied as shown in the foregoing example.

In the electronic apparatus 300 according to the embodiment of the disclosure as shown in FIG. 9, the controller 160 controls the image signal corresponding to the content having the first format to correspond to the content having the second format for the second image processor 330b corresponding to the communicator 320 upon sensing that the communicator 120 is activated, and provides the converted image signal corresponding to the content having the second format to the external apparatus 200 connected through the communicator 320. In other words, the image signal converted to correspond to the content having the second format by the converter 333 of the second image processor 330b is subjected to the scaler 335 and the encoder 337 and then output through the communicator 320.

Independently, when the external apparatus 200 connected by a wire through the connector 310 supports the content of the first format, the controller 160 performs control without converting the image signal corresponding to the content having the first format with regard to the first image processor 330a corresponding to the connector 310. In other words, the image signal corresponding to the content having the first format output from the first image processor 330a is output through the connector 310. Thus, the display apparatus supporting the content of the first format can display an image with improved quality that is as high as possible.

On the other hand, when the external apparatus 200 connected by a wire through the connector 310 does not support the content of the first format, the controller 160 performs control to convert the image signal corresponding to the content having the first format for the first image processor 330a corresponding to the connector 310 to correspond to the content having the second format. In other words, the image signal corresponding to the content having the second format converted by the first image processor 330a is output through the connector 310.

According to the foregoing embodiment as shown in FIG. 9, the image signal corresponding to the content having the first format or the second format is output to the external apparatus 200 connected to the electronic apparatus 100 by a wire according to whether the external apparatus 200 supports the content of the first format, and the image signal converted to correspond to the content having the second format is output to the external apparatus 200 connected wirelessly.

Therefore, image distortion caused by a difference in expression range does not occur in the external apparatus 200 connected wirelessly. Further, in the external apparatus 200 connected by a wire, an image is displayed with quality as high as possible according to the specifications of the external apparatus 200 or image distortion is prevented even when the content and the external apparatus 200 are different in an expression range.

Meanwhile, the controller 160 of the electronic apparatus 300 according to the embodiment shown in FIG. 9 may further determine whether the external apparatus 200 connected through the communicator 320 supports the content of the first format. Specifically, the determination of whether the external apparatus 200 supports the content having the first format is determining whether the expression range based on the format of the content itself is normally displayed through an image output by processing the image signal corresponding to the content having the first format in the external apparatus 200 connected wirelessly.

Upon determining that the external apparatus 200 does not support the content of the first format, the image signal converted to correspond to the content having the second format by the converter 333 of the second image processor 330b is subjected to the scaler 335 and the encoder 337 and then output to the communicator 320.

On the other hand, upon determining that the external apparatus 200 supports the content of the first format, the image signal corresponding to the content having the first format is subjected to the scaler 335 and the encoder 337 and then output to the communicator 320. The determination of the controller 160 about whether the content having the first format is supported will be described in more detail with reference to an operation 704 of FIG. 10.

In the electronic apparatus 300 according to the embodiment shown in FIG. 9, there are a plurality of paths via which image signals are output by the plurality of image processors 330a and 330b corresponding to the image output means, i.e. the connector 310 and the communicator 320, and therefore the independently processed image signal is provided through each image output means.

Figure 10:
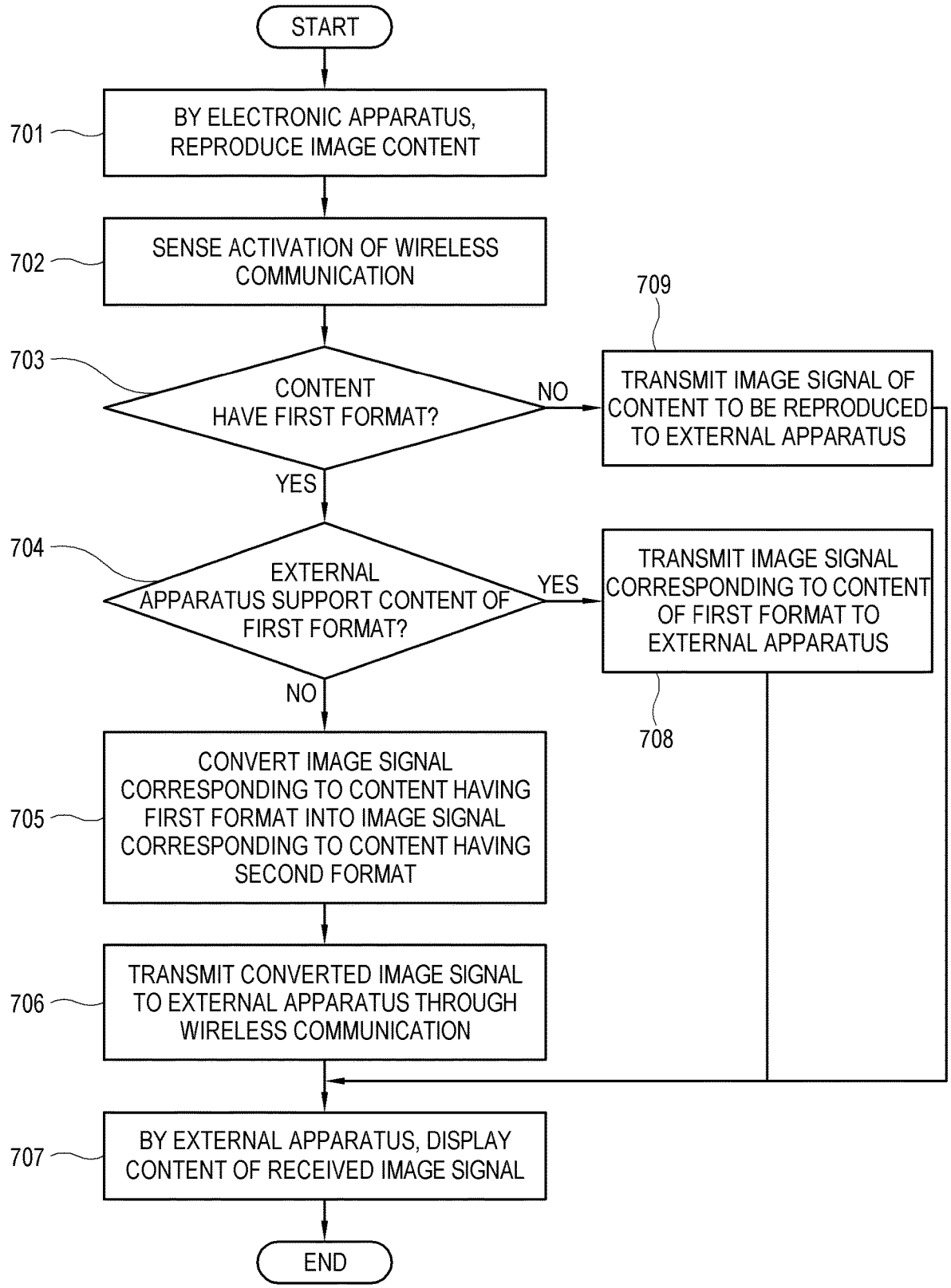
FIG. 10 is a flowchart that illustrates a method of controlling an electronic apparatus according to an embodiment of the disclosure.
Figure 11:
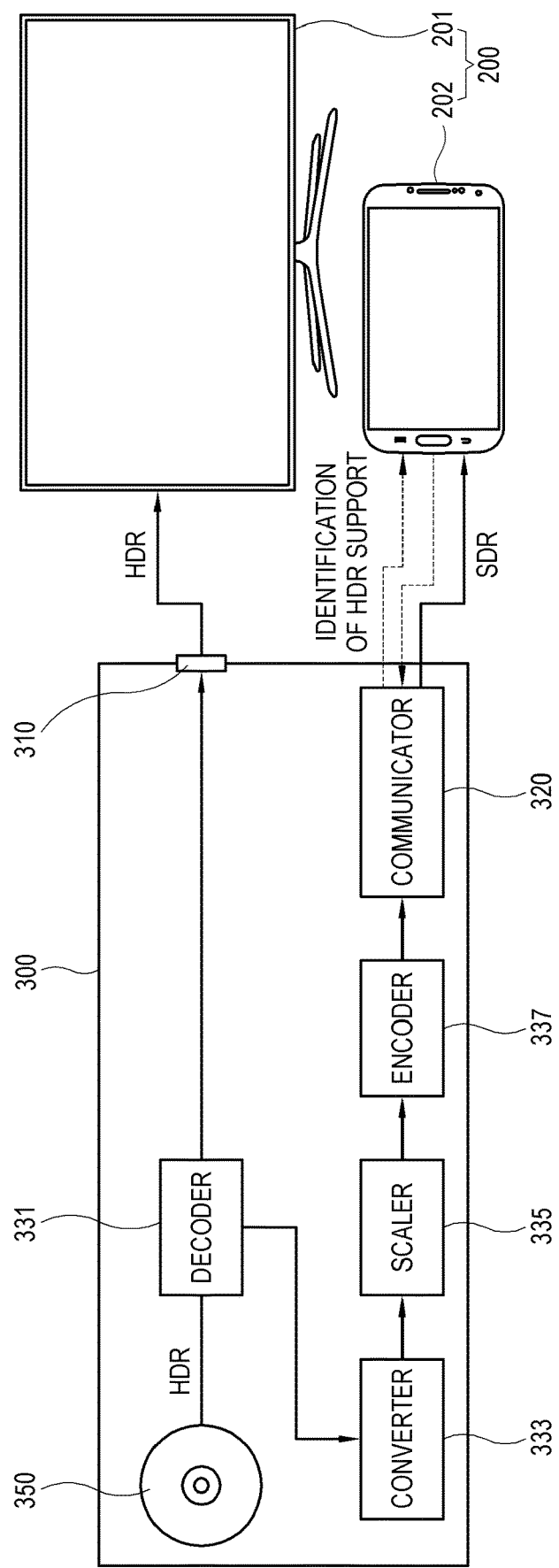
FIG. 11 is a diagram that illustrates providing image content to a plurality of external apparatuses according to an embodiment of the disclosure.

FIG. 10 is a flowchart showing a control method of an electronic apparatus according to a second embodiment of the disclosure, and FIG. 11 illustrates an example that image content is provided to a plurality of external apparatuses according to the second embodiment of the disclosure. The second embodiment set forth herein may be realized by the electronic apparatus 300 described with reference to FIG. 9.

As shown in FIG. 10, a command issued to reproduce predetermined image content is received in the electronic apparatus 300 (701). Here, the controller 160 of the electronic apparatus 300 may receive the command for reproducing the content through the remote controller provided as the user input receiver 140, and the received content reproducing command may include a command for making the display apparatus 201 connected through the connector 310 as shown in FIG. 11 output the reproduced image content. The image content to be reproduced is stored in a BD or the like optical disc provided as the storage 150 by way of example.

In relation to the reproduction of the image content in the operation 701, the controller 160 senses whether the communicator 320 for the wireless communication is activated (702). Here, the controller 160 senses whether the communicator 320 is activated, when wireless communication connection with or setting for the connection with a specific external apparatus 200 is made, or when setting is made to transmit the image content to a specific external apparatus 200 through the wireless communication. For example, the controller 160 senses that the wireless communication is activated, when an application for the wireless communication (e.g. a BD-to-mobile App) as described in the embodiment of FIG. 5 is executed in a predetermined external apparatus 200, i.e. the mobile apparatus 202 of FIG. 11 and makes wireless connection between the electronic apparatus 300 and the external apparatus 200 (i.e. the mobile apparatus 202 of FIG. 11).

According to an embodiment, the controller 160 of the electronic apparatus 300 may sense that the communicator 120 is activated, while the image signal is transmitted to the display apparatus 201 and the corresponding content is reproduced in the display apparatus 201.

Upon sensing that the wireless communication is activated in operation 702, the controller 160 determines whether the image content to be reproduced is the content having the first format (703). Here, the image content having the first format may be the HDR content by way of example, and the controller 160 may determine the format of the image content based on metadata of the content divided by the decoder 331.

Based on determining that the image content to be reproduced is the content having the first format in operation 703, the controller 160 determines whether the external apparatus 200 supports the content having the first format (704). Here, the determination of whether the external apparatus 200 supports the content having the first format is determining whether the expression range based on the format of the content itself is normally displayed when the image signal corresponding to the content having the first format in the external apparatus 200 is processed and displayed as an image.

Specifically, the controller 160 obtains information about the mobile apparatus 202 by loading identification data related to the expression range of the mobile apparatus 202 from the external apparatus 200 that performs the wireless communication through the communicator 320, i.e. the storage 250 of the mobile apparatus 202 of FIG. 11, and determines whether the mobile apparatus 202 supports the content of the first format on the basis of the obtained information. That is, it is possible to check content information supportable in a wirelessly-connected apparatus through a simple process.

Here, the identification data related to the expression range of the mobile apparatus 202 may be recorded/stored in a predetermined area of the storage 250 like the EDID at a point in time when the mobile apparatus 202 is manufactured or when a predetermined program/application is installed or executed in the mobile apparatus 202. The application that causes the identification data be recorded or stored includes the BD-to-mobile App described with reference to FIG. 5. Further, there are no limits to the point in time when the identification data is loaded, and the point in time for loading the identification data includes a point in time when the wireless communication is set between the electronic apparatus 300 and the external apparatus 200, a point in time when the data is transmitted and received for the first time after completing the setting, a point in time when an application for transmitting the image content is installed or executed, etc.

According to an embodiment, the controller 160 of the electronic apparatus 300 may receive a user's input about whether or not the mobile apparatus 202 supports the image signal corresponding to the content having the first format. For example, a UI about the support of the HDR content is displayed on the display 270 of the mobile apparatus 202 as an application (e.g. the BD-to-mobile App) about the wireless transmission is executed, and a control signal may be transmitted to the electronic apparatus 300 in response to a user's selection on the UI.

Meanwhile, alternatively, when the external apparatus 200 includes both the connector 210 and the communicator 220 and the storage 250 includes an EDID area assigned to a predetermined port (e.g. HDMI) of the connector 210, the controller 260 of the external apparatus 200 may obtain the corresponding data by accessing the EDID area and provide the obtained data as the identification data to the electronic apparatus 300 connected by the wireless communication.

Further, when the electronic apparatus 300 connects with a plurality of external apparatuses 200 through the connector 310 or the communicator 320, the controller 160 may determine whether each of the plurality of external apparatuses 200 supports the image signal corresponding to the content having the first format. To determine whether the external apparatus 200 connected through the connector 310 supports the content having the first format, the EDID may be loaded from the storage 250 of the external apparatus 200. The detailed operations of the determination are the same as those described with reference to FIG. 9. According to an embodiment, the foregoing determination of whether the apparatus connected through the connector 310 supports the image content may be performed at a point in time when the reproduction command of the operation 701 is issued.

The controller 160 of the electronic apparatus 300 loads the identification data from the external apparatus 200 as described above, and determines whether the image signal corresponding to the content having the first format is supported in each individual external apparatus 200, which is connected to the electronic apparatus 300 wirelessly or by a wire, on the basis of the loaded data. For example, when the external apparatus 200 includes the display apparatus 201 connected by a wire through the connector 310 and the mobile apparatus 202 connected wirelessly through the communicator 320 as shown in FIG. 11, the controller 160 may determine that the display apparatus 201 supports the content of the first format (e.g. HDR content) and that the mobile apparatus 202 does not support the content of the first format.

Based on determining that the external apparatus 200 does not support the content having the first format in operation 704, the controller 160 controls the image processors 330a and 330b to convert the image signal corresponding to the content having the first format into the signal corresponding to the content (e.g., SDR or LDR content) having the second format different from the first format (705).

Specifically, as shown in FIG. 11, when the mobile apparatus 202 does not support the first image content, the controller 160 performs control so that the image signal corresponding to the content having the first format can be converted by the converter 333 to correspond to the content having the second format. The converted image signal corresponding to the content having the second format is subjected to the scaler 335 and the encoder 337 and output as encoded to the communicator 320.

The image signal converted in the operation 705 to correspond to the content having the second format is transmitted to the external apparatus 200 (706). Specifically, the controller 160 controls the communicator 320 to transmit the image signal corresponding to the content having the second format to the corresponding external apparatus 200, i.e. the mobile apparatus 202 of FIG. 11 by wireless communication.

The external apparatus 200, i.e. the mobile apparatus 202 receives the image signal corresponding to the content having the second format transmitted in the operation 706, and processes, i.e. decodes the image signal so that the content having the second format can be displayed on the display 370 (707). Accordingly, image distortion does not occur because the content having the second format, i.e. the SDR content is displayed on the external apparatus 200 (e.g. the mobile apparatus 202 of FIG. 11), which is wirelessly connected to the electronic apparatus 300 and does not support the content having the first format.

Based on determining that a predetermined external apparatus 200 supports the content having the first format in operation 704, the controller 160 transmits the image signal corresponding to the content having the first format to the external apparatus 200 without conversion (708). Specifically, as shown in FIG. 11, when the display apparatus 201 supports the content of the first format, the image signal corresponding to the content having the first format decompressed by the decoder 331 of the first image processor 330a is directly output to the connector 310. According to an embodiment, upon sensing that the communicator 120 is activated while the display apparatus 201 displays the image content in operation 701, the controller 160 continuously outputs the image signal corresponding to the content having the first format to the display apparatus 201.

Based on determining that content to be reproduced is not the content of the first format in operation 703, the controller 160 transmits the image signal of the image content to be reproduced to the external apparatus 200 without conversion (709).

The external apparatus 200, i.e. the mobile apparatus 202 or the display apparatus 201 receives the image signal transmitted in the operation 708 or 709, and displays the content of the received image signal on the display 370 (707).

In the foregoing embodiment, the electronic apparatus 300 determines whether each of the external apparatus 200 connected wirelessly through the communicator 320, i.e. the mobile apparatus 202 of FIG. 11 and the external apparatus 200 connected by a wire through the connector 310, i.e. the display apparatus 201 of FIG. 11 supports the content of the first format, and provides the image signal corresponding to the content having the first format or the image signal converted to correspond to the content having the second format according to determination results. The embodiment of FIG. 11 shows an example that the image signal corresponding to the content having the first format is transmitted to the display apparatus 201, and the image signal corresponding to the content having the second format is transmitted to the mobile apparatus 202, but the disclosure is not limited to the example of FIG. 11. Thus, the disclosure may be differently embodied corresponding to the determination results of the apparatus. For example, the disclosure may include a case that the image signal corresponding to the content having the second format may be transmitted to the display apparatus 201 that does not support the content of the first format, and the image signal corresponding to the content having the first format may be transmitted to the mobile apparatus 202 that supports the content of the first format. Further, according to the determination results for each apparatus, the image signal corresponding to the content having the first format or the image signal corresponding to the content having the second format may be transmitted to both the display apparatus 201 and the mobile apparatus 202.

According to the foregoing embodiment, the external apparatus 200, which supports the content of the first format, can express an image with quality as high as possible, and the external apparatus 200, which does not support the content of the first format, does not make image distortion due to difference in expression range from the content.

Figure 12:
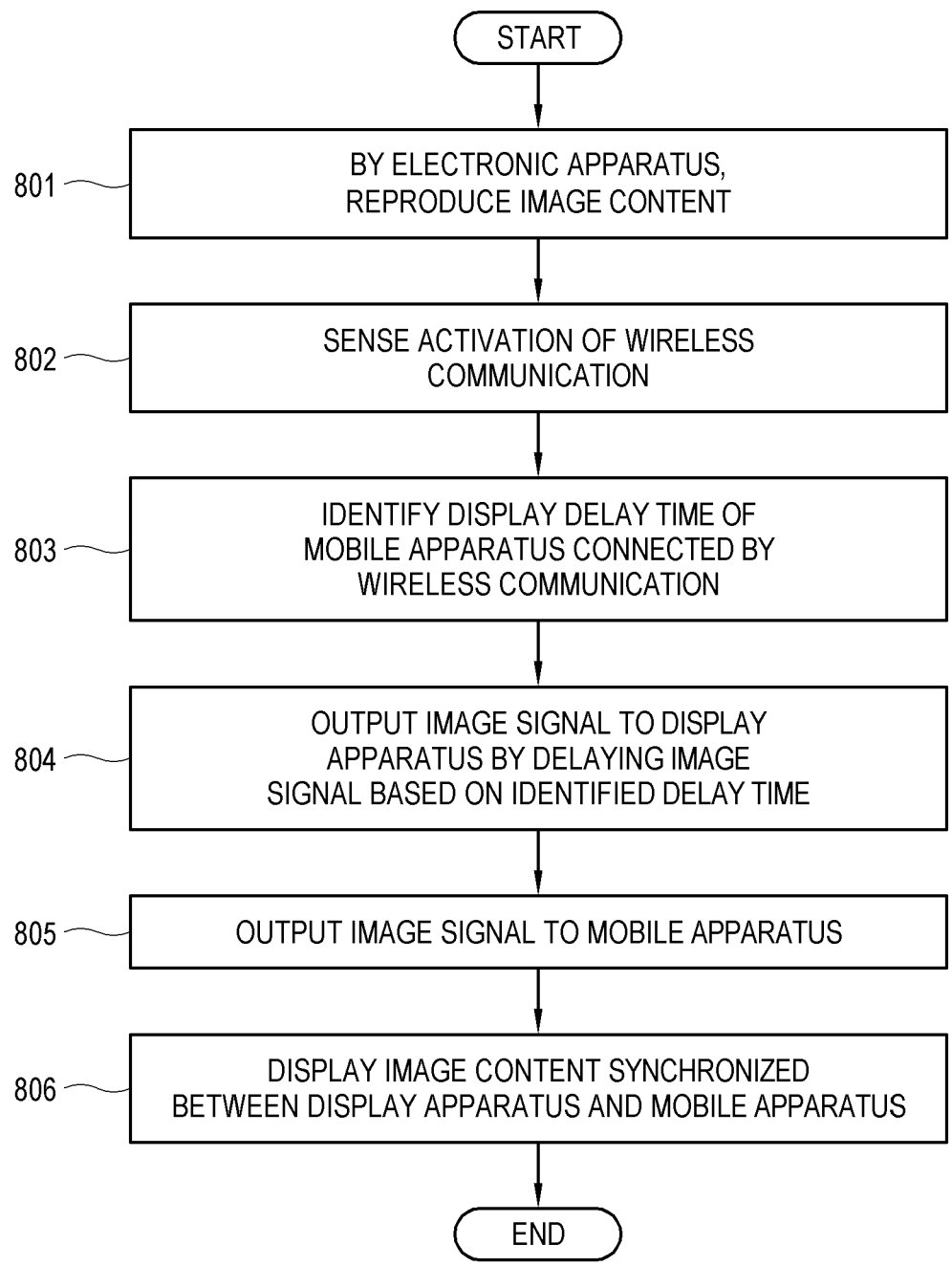
FIG. 12 is a flowchart that illustrates a method of controlling an electronic apparatus according to an embodiment of the disclosure.
Figure 13:
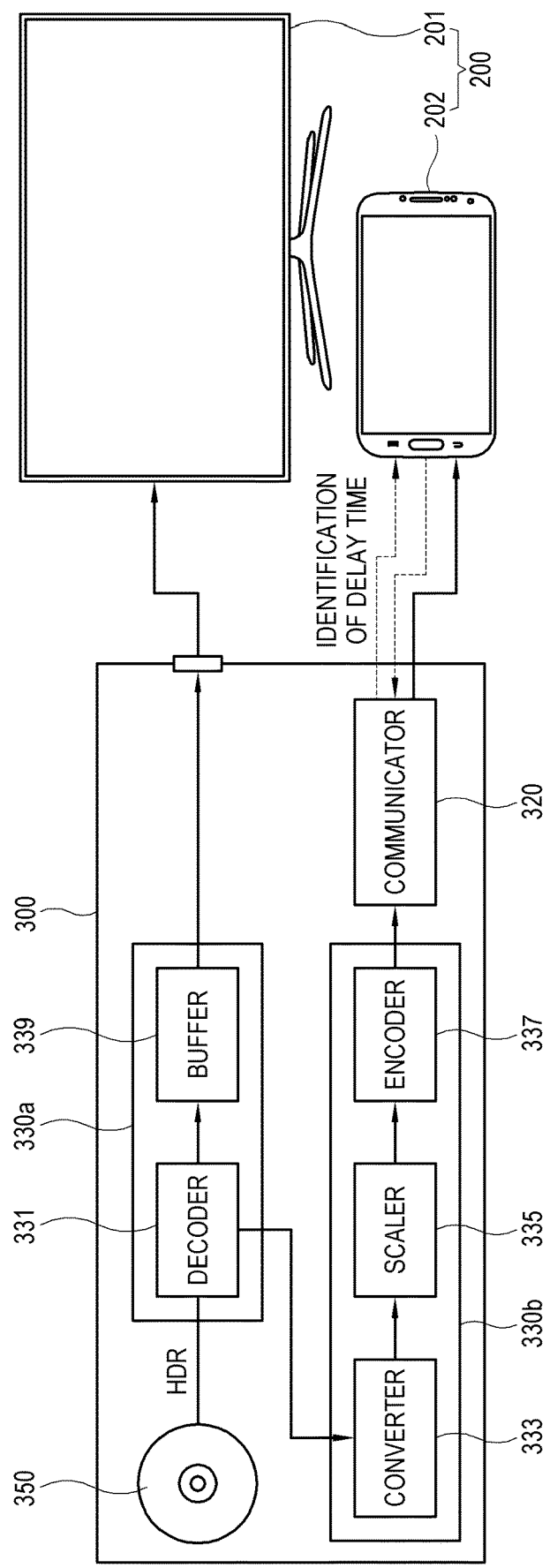
FIG. 13 is a diagram that illustrates providing image content to a plurality of external apparatuses according to an embodiment of the disclosure.

FIG. 12 is a flowchart that illustrates a method of controlling an electronic apparatus according to an embodiment of the disclosure, and FIG. 13 is a diagram that illustrates providing image content to a plurality of external apparatuses according to the embodiment of the disclosure. The electronic apparatus 300 for performing operations according to the embodiment may be configured by adding a buffer 339, i.e. a video buffer to the first image processor 330a of the electronic apparatus 300 described with reference to FIG. 9.

In the embodiment shown in FIGS. 12 and 13, the electronic apparatus 300 delays an image signal using the buffer 339 for output to the connector 310 so that image content displayed on the external apparatus 201 connected by a wire through the connector 310 can be synchronized with image content displayed on the external apparatus 200 connected wirelessly through the communicator 130. Thus, an image is synchronized between and displayed in the external apparatus and the display apparatus.

As shown in FIG. 12, a command issued to reproduce predetermined image content is received in the electronic apparatus 300 (801). Here, the controller 160 of the electronic apparatus 300 may receive the command for reproducing the content through the remote controller provided as the user input receiver 140, and the received content reproducing command may include a command for making the display apparatus 201 connected through the connector 310 as shown in FIG. 13 output reproduced content. The image content to be reproduced is the image content having the first format (e.g. HDR content), which is stored in a BD or the like optical disc provided as the storage 150 by way of example.

In relation to the reproduction of the image content in the operation 801, the controller 160 senses whether the communicator 320 for the wireless communication is activated (802). Here, the controller 160 senses whether the communicator 320 is activated, when wireless communication connection with or setting for the connection with a specific external apparatus 200 is established, or when setting is made to transmit the image content to a specific external apparatus 200 through the wireless communication. For example, the controller 160 senses that the wireless communication is activated, when an application for the wireless communication (e.g. a BD-to-mobile App) as described in the embodiment of FIG. 5 is executed in a predetermined external apparatus 200, i.e. the mobile apparatus 202 of FIG. 13 and establishes wireless connection between the electronic apparatus 300 and the corresponding external apparatus 200 (i.e. the mobile apparatus 202 of FIG. 13).

Upon sensing that the wireless communication is activated in operation 802, the controller 160 identifies a display delay time of the mobile apparatus 202 connected by the activated wireless communication (803). Here, the display delay time is determined based on the sum of time taken in image processing of the second image processor 330b and time taken in transmitting data through the communicator 12. The determined display delay time may be varied depending on whether the mobile apparatus 202 supports the process of the image signal corresponding to the content having the first format. Further, the display delay time may be varied depending on whether the display apparatus 201 supports the process of the content having the first format. The operations of determining whether the mobile apparatus 202 and the display apparatus 201 support the content of the first format are the same as those described with reference to FIGS. 8 to 10.

According to an embodiment, the controller 160 of the electronic apparatus 300 obtains information about time taken in data transmission by transmitting and receiving a test signal when the wireless communication with the mobile apparatus 202 is set, and the obtained information may be used in determining the display delay time.

Alternatively, the controller 160 of the electronic apparatus 300 may typically use delay information of time taken in the wireless communication to determine the display delay time.

Alternatively, the controller 160 of the electronic apparatus 300 may receive the display delay time from a user. Here, the controller 160 may control the display 270 of the display apparatus 201 to display a UI on which the display delay time is selectable, and receive a user's selection on the displayed UI through the user input receiver 140.

When the display delay time is identified in the operation 803, the controller 160 delays the image signal in accordance with the identified delay time and then outputs the image signal to the display apparatus 201 through the connector 210 (804). Here, the output image signal may be the image signal corresponding to the content having the first format or the image signal converted to correspond to the content having the second format. The operations of converting the image signal to be provided to the display apparatus 201 to correspond to the content having the second format are the same as those described with reference to FIGS. 8 to 10.

Further, the controller 160 outputs the image signal to the mobile apparatus 202 through the communicator 220 (805). Here, the output image signal may be the image signal corresponding to the content having the first format or the image signal converted to correspond to the content having the second format. The operations of converting the image signal to be provided to the mobile apparatus 202 to correspond to the content having the second format are the same as those described with reference to FIGS. 8 to 10.

The external apparatuses 200, i.e. the display apparatus 201 and the mobile apparatus 202 receive the synchronized image signals output in the operations 804 and 805, respectively (806). Accordingly, the display apparatus 201 and the mobile apparatus 202 output the synchronized images, and therefore cause no inconvenience for a user who uses both apparatuses at a time to view the image content. For example, a user who is viewing the image content through the display apparatus 201 can continuously view the same content through the mobile apparatus 202 while moving to another place, and is thus not hindered in viewing the image content because the images are naturally continued.

The foregoing embodiment is applicable regardless of whether the image content displayed on the display apparatus 201 and the image content displayed on the mobile apparatus 202 have different formats or the same format. In other words, according to results of determining the expressible ranges of the apparatuses, the image content having the first format may be displayed on the display apparatus 201 that supports the image content having the first format and the image content having the second format may be displayed on the mobile apparatus 202 that does not support the image content having the first format, or the image content having the second format may be displayed on the display apparatus 201 that does not support the image content having the first format and the image content having the first format may be displayed on the mobile apparatus 202 that supports the image content having the first format. Further, according to results of determining the expressible ranges of the apparatuses, both the display apparatus 201 and the mobile apparatus 202 may display the image content having the first format or the image content having the second format.

Figure 14:
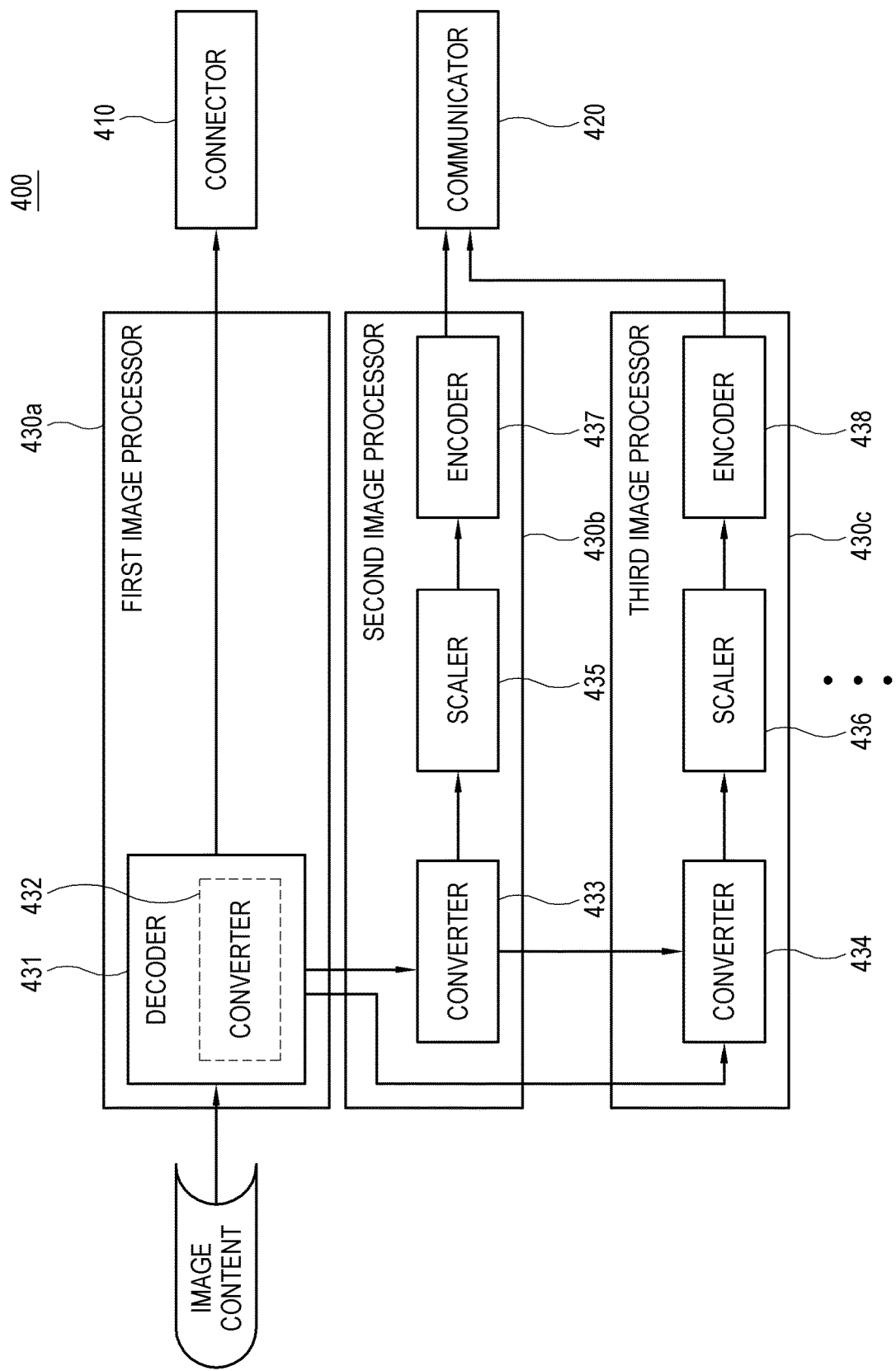
FIG. 14 is a block diagram that illustrates a configuration of an image processor provided in an electronic apparatus according to an embodiment of the disclosure.

FIG. 14 is a block diagram that illustrates a configuration of an image processor provided in an electronic apparatus according to an embodiment of the disclosure.

As shown in FIG. 14, an electronic apparatus 400 according to this embodiment includes a first image processor 430*a*, a second image processor 430*b* and a third image processor 430*c* as compared with the electronic apparatus 100 described with reference to FIGS. 2 and 3 and the electronic apparatus 300 described with reference to FIG. 9. Therefore, the same terms and reference numerals as those of FIGS. 2, 3 and 9 will be given to the other elements except the first to third image processors 430*a*, 430*b* and 430*c*, a connector 410 and a communicator 420 connecting with the first to third image processors 430*a*, 430*b* and 430*c*, and detailed descriptions thereof will be omitted to avoid repetitive descriptions.

The electronic apparatus 400 of FIG. 14 may simultaneously perform wireless communication with the plurality of apparatuses through a communicator 420, and determine whether each individual apparatus connected through the wireless communication supports the image content having the first format, thereby outputting the image signal corresponding to the content having the first format or converted to correspond to the content having the second format.

For example, when the communicator 420 of the electronic apparatus 400 performs wireless communication with a smart phone and an HMD apparatus, the controller 160 may determine whether each of the smart phone and the HMD apparatus supports the content of the first format. When the smart phone supports the content of the first format but the HMD apparatus does not support the content of the first format, the third image processor 430*c* converts the image signal to correspond to the content having the second format through a converter 434 and then outputs the image signal corresponding to the content having the second format to a communicator 420 via a scaler 436 and an encoder 438. On the other hand, the second image processor 430*b* outputs the image signal corresponding to the content having the first format to the communicator 420 via the scaler 435 and the encoder 437 without conversion in the converter 433.

In the disclosure, the number of image processors is not limited to that shown in FIG. 14, and the image processors may be additionally provided so that optimized image content can be respectively provided to a plurality of external apparatuses 200 connectable wirelessly through the communicator 420.

Figure 15:
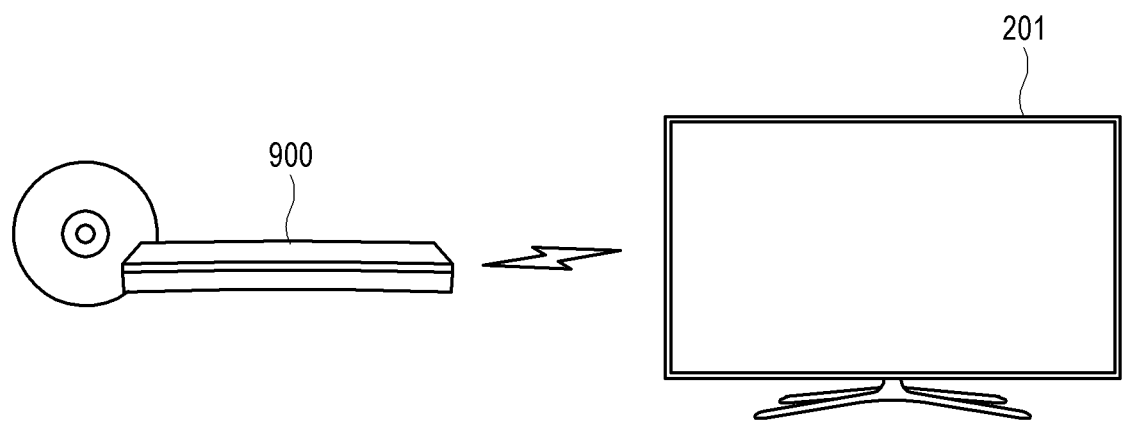
FIG. 15 is a diagram that illustrates a system of an electronic apparatus and an external apparatus according to an embodiment of the disclosure.
Figure 16:
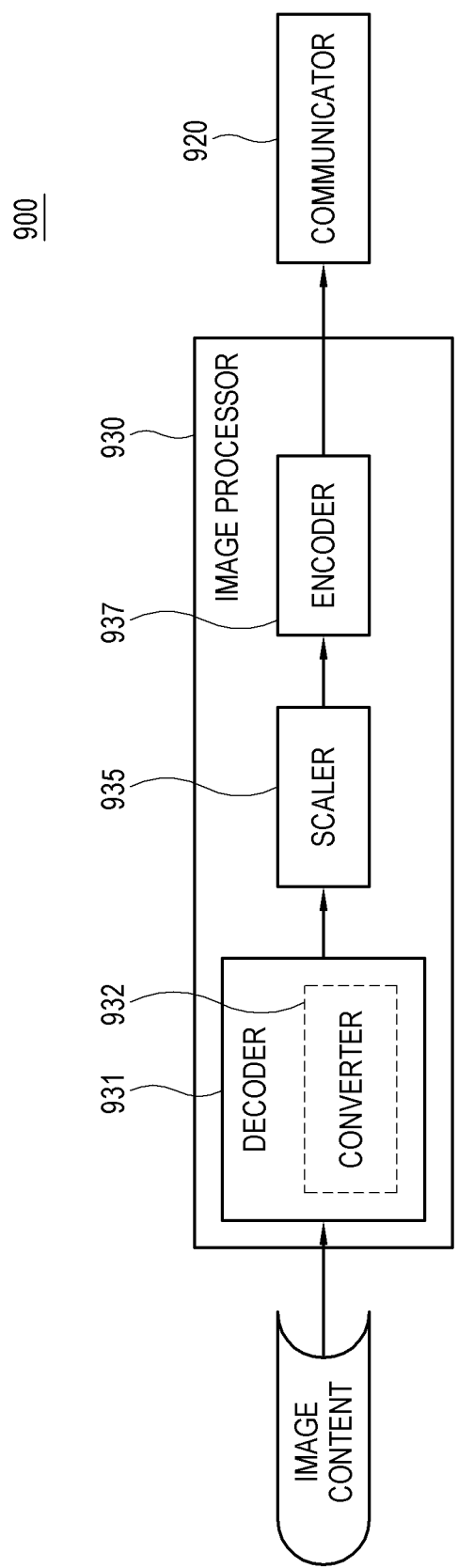
FIG. 16 is a block diagram that illustrates a configuration of an image processor provided in the electronic apparatus according to the embodiment of FIG. 15.

FIG. 15 is a diagram that illustrates a system of an electronic apparatus and an external apparatus according to an embodiment of the disclosure, and FIG. 16 is a block diagram that illustrates a configuration of an image processor provided in the electronic apparatus according to the embodiment of FIG. 15.

According to the embodiment shown in FIGS. 15 and 16, a TV or the like display apparatus 201 may be wirelessly connected to an electronic apparatus 900.

The electronic apparatus 900 according to the embodiment shown in FIGS. 15 and 16 connects with the external apparatus 200, e.g. the display apparatus 201 of FIG. 15 through a communicator 920 for wireless communication and outputs an image signal processed by an image processor 930 to the communicator 920, as compared with the electronic apparatus 100 described with reference to FIGS. 2 and 3. In other words, the electronic apparatus 900 of FIGS. 15 and 16 may not include the connector for wired connection. Therefore, the same terms and reference numerals as those of FIGS. 2 and 3 will be given to the other elements except the image processor 930 and the communicator 920, and detailed descriptions thereof will be omitted to avoid repetitive descriptions.

The controller 160 of the electronic apparatus 900 may receive a command issued to reproduce predetermined image content in the wirelessly connected display apparatus 201. Here, the controller 160 may receive a content reproducing command through the remote controller or the like provided as the user input.

When the content to be reproduced in response to the reproducing command is the content having the first format, the controller 160 determines whether the wirelessly connected display apparatus 201 supports the process of the image signal corresponding to the content having the first format. Here, the controller 160 may obtain information about the display apparatus 201 by loading the expression range and the identification data of the display apparatus 201 from the storage 250 of the display apparatus 201, and determine whether the display apparatus 201 supports the content having the first format on the basis of the obtained information. There are no limits to a point in time when, the identification data is loaded.

According to an embodiment, the identification data includes EDID previously stored in the display apparatus 201, and the controller 260 of the display apparatus 201 may obtain the corresponding data by accessing the EDID area of the storage 250 and provide the obtained data to the electronic apparatus 900 through the wireless communication.

Alternatively, the controller 160 of the electronic apparatus 900 receives a user's input about whether the display apparatus 201 supports the content of the first format, and determines whether the wirelessly connected display apparatus 201 supports the content of the first format.

Based on determining that the wirelessly connected display apparatus 201 does not support the content of the first format, the controller 160 controls a converter 932 of an image processor 930 to convert the image signal corresponding to the content having the first format to correspond to the content having the second format. The converted image signal corresponding to the content having the second format is adjusted and encoded by a scaler 935 and an encoder 937 and then output to a communicator 920. The display apparatus 201 receives and processes, i.e. decodes the image signal and displays the content having the second format on the display 270, thereby causing no image distortion.

Based on determining that the wirelessly connected display apparatus 201 supports the content of the first format, the controller 160 performs control to make the image signal corresponding to the content having the first format, which is decoded by a decoder 931 of the image processor 930, be adjusted and decoded by the scaler 935 and the encoder 937 without conversion and then output to the communicator 920. The display apparatus 201 receives and processes, i.e. decodes the image signal and displays the content of the first format on the display 270, thereby providing an image having improved quality.

According to embodiments of the disclosure as described above, the electronic apparatus in the disclosure converts the HDR content of high quality into the SDR or LDR content and provides the SDR or LDR content to the external apparatus upon sensing that the wireless communication is activated, and therefore image distortion does not occur in the wirelessly connected external apparatus that does not support the HDR content.

Further, the electronic apparatus of the disclosure determines whether the HDR content is supported in the external apparatuses connected wirelessly or by a wire, and selectively converts the HDR content to be transmitted to the external apparatuses, thereby providing an image having quality optimized to the specifications of the apparatus without image distortion caused by difference in the expression range.

Further, the electronic apparatus of the disclosure synchronizes image content to be output to a plurality of external apparatuses connected by a wire and wirelessly, so that a user can seamlessly and continuously view an image while alternately using the plurality of apparatuses.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a volatile or nonvolatile storage such as a ROM or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

As described above, in an electronic apparatus, a method of controlling the same, and a recording medium thereof according to the disclosure, the HDR content of high quality is converted into the SDR or LDR content and provided to the external apparatus upon sensing that the wireless communication is activated, and therefore image distortion does not occur in the wirelessly connected external apparatus that does not support the HDR content.

Further, the electronic apparatus of the disclosure determines whether the HDR content is supported in the external apparatuses connected wirelessly or by a wire, and selectively converts the HDR content to be transmitted to the external apparatuses, thereby providing an image having quality optimized to the specifications of the apparatus without image distortion caused by difference in the expression range.

Further, the electronic apparatus of the disclosure synchronizes image content to be output to a plurality of external apparatuses connected by a wire and wirelessly, so that a user can seamlessly and continuously view an image while alternately using the plurality of apparatuses.

An aspect of one or more embodiments is to provide an electronic apparatus, a method of controlling the same, and a recording medium thereof, in which image distortion is prevented in an external apparatus that displays high dynamic range (HDR) content received through wireless communication.

Another aspect of one or more embodiments is to provide an electronic apparatus, a method of controlling the same, and a recording medium thereof, in which an image signal is selectively converted and transmitted according to whether or not an external apparatus of wirelessly receiving image data supports HDR content.

Still another aspect of one or more embodiments is to provide an electronic apparatus, a method of controlling the same, and a recording medium thereof, in which a plurality of external apparatuses that receive image data from the electronic apparatus by a wire or wirelessly are synchronized to display an image.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus comprising:
   a connector configured to connect with a display apparatus by a wire;
   a communicator configured to perform wireless communication with an external apparatus;
   an image processor configured to process image signals; and
   a processor configured to:
     transmit an image signal of predetermined image content to the display apparatus through the connector,
     receive a user input to reproduce the predetermined image content in the external apparatus by activating the communicator for the wireless communication while the image signal is transmitted to the display apparatus through the connector,
     based on identifying a connection with the external apparatus through the communicator, identify whether the image signal being transmitted to the display apparatus corresponds to high dynamic range (HDR) format or standard dynamic range (SDR) format;
     based on the identifying the image signal to correspond to the HDR format, control the image processor to convert the image signal having attributes corresponding to the HDR format into an image signal having attributes corresponding to the SDR format which has a narrower expression range of an image than the HDR format, the attributes comprising a gamma characteristic and a color gamut characteristic, and
     transmit the image signal, which is converted corresponding to the SDR format, to the display apparatus through the connector and to the external apparatus through the communicator.

2. The electronic apparatus according to claim 1, wherein the image processor comprises a first image processor configured to process the image signal for output through the connector and a second image processor configured to process the image signal for output through the communicator, and based on identifying the connection with the external apparatus through the communicator, the second image processor is configured to convert the image signal having attributes corresponding to the HDR format into the image signal having attributes corresponding to the SDR format, and control the communicator to transmit the image signal having attributes corresponding to the SDR format to the external apparatus.

3. The electronic apparatus according to claim 2, wherein, based on identifying the connection with the external apparatus through the communicator, the first image processor is configured to continuously process the image signal having attributes corresponding to the HDR format being transmitted to the display apparatus through the connector, and control the image signal having attributes corresponding to the HDR format to be transmitted to the display apparatus through the connector.

4. The electronic apparatus according to claim 1, wherein the processor is further configured to identify a display delay time of the content reproduced in the external apparatus, and control the content displayed on the external apparatus and the display apparatus to be synchronized by delaying the image signal transmitted to the display apparatus through the connector based on the display delay time of the content reproduced in the external apparatus.

5. The electronic apparatus according to claim 1, wherein the processor is further configured to identify the connection with the external apparatus through the communicator based on at least one of setting the wireless communication with the external apparatus, setting content to be provided to the external apparatus, or installing or executing an application for the wireless communication in the external apparatus.

6. An electronic apparatus comprising:
   a connector configured to connect with a display apparatus by a wire;
   a communicator configured to perform wireless communication with an external apparatus;
   an image processor configured to process an image signal; and
   a processor configured to:
     transmit an image signal of predetermined image content to the display apparatus through the connector,
     receive a user input to reproduce the predetermined image content in the external apparatus by activating the communicator for the wireless communication while transmitting the image signal to the display apparatus through the connector,
     based on identifying a connection with the external apparatus through the communicator, identify whether the image signal being transmitted to the display apparatus corresponds to high dynamic range (HDR) format or standard dynamic range (SDR) format,
     based on the identifying the image signal to correspond to the HDR format, identify whether the external apparatus, which is wirelessly connected through the communicator, supports reproduction of the HDR format, based on reproduction of the HDR format being unsupported by the external apparatus, control the image processor to convert the image signal having attributes corresponding to the HDR format into an image signal having attributes corresponding to the SDR format that the external apparatus is able to reproduce, the SDR format having a narrower expression range of an image than the HDR format, the attributes comprising a gamma characteristic and a color gamut characteristic, and
     transmit the image signal, which is converted corresponding to the SDR format, to the display apparatus through the connector and to the external apparatus through the communicator.

7. The electronic apparatus according to claim 6, wherein the image processor comprises a first image processor configured to process the image signal for output through the connector and a second image processor configured to process the image signal for output through the communicator, and based on identifying the connection with the external apparatus through the communicator, the second image processor is configured to convert the image signal having attributes corresponding to the HDR format into the image signal having attributes corresponding to the SDR format corresponding to a result of whether the external apparatus wirelessly connected through the communicator supports reproduction of the HDR format, and control the communicator to transmit the image signal having attributes corresponding to the SDR format to the external apparatus.

8. The electronic apparatus according to claim 7, wherein the processor is further configured to identify whether the display apparatus connected through the connector supports the reproduction of the HDR format, based on the display apparatus being identified to support the reproduction of the HDR format, control the first image processor to continuously process the image signal having attributes corresponding to the HDR format being transmitted to the display apparatus through the connector, and control the image signal having attributes corresponding to the HDR format to be transmitted to the display apparatus through the connector.

9. The electronic apparatus according to claim 6, wherein the processor is further configured to identify a display delay time of the content reproduced in the external apparatus, and control the content displayed on the external apparatus and the display apparatus to be synchronized by delaying the image signal transmitted to the display apparatus through the connector based on the display delay time of the content reproduced in the external apparatus.

10. The electronic apparatus according to claim 7, wherein the processor is further configured to receive identification data of the external apparatus through the communicator, and identify whether the external apparatus supports the HDR format based on the identification data.

11. The electronic apparatus according to claim 6, wherein the processor is further configured to identify the connection with the external apparatus through the communicator based on at least one of setting the wireless communication with the external apparatus, setting content to be provided to the external apparatus, or installing or executing an application for the wireless communication in the external apparatus.

12. A method of controlling an electronic apparatus, the method comprising:

transmitting an image signal of predetermined image content to a display apparatus through a wired-connected connector;

receiving a user input to reproduce the predetermined image content in an external apparatus by activating a communicator for wireless communication while the image signal is transmitted to the display apparatus through the wired-connected connector;

based on identifying a connection with the external apparatus through the communicator for the wireless communication, identifying whether the image signal being transmitted to the display apparatus corresponds to high dynamic range (HDR) format or standard dynamic range (SDR) format;

based on the identifying the image signal to correspond to the HDR format, converting the image signal having attributes corresponding to the HDR format into an image signal having attributes corresponding to the SDR format which has a narrower expression range of an image than the HDR format, the attributes comprising a gamma characteristic and a color gamut characteristic; and transmitting the image signal, which is converted corresponding to the SDR format, to the display apparatus through the wired-connected connector and to the external apparatus through the communicator.

13. The method according to claim 12, wherein the electronic apparatus comprises a first image processor configured to process the image signal for output through the wired-connected connector and a second image processor configured to process the image signal for output through the communicator, and the converting of the image signal comprises converting the image signal having attributes corresponding to the HDR format into the image signal having attributes corresponding to the SDR format by the second image processor.

14. The method according to claim 13, further comprising:

continuously processing the image signal having attributes corresponding to the HDR format being transmitted to the display apparatus through the wired-connected connector by the first image processor; and transmitting the image signal having attributes corresponding to the HDR format to the display apparatus through the wired-connected connector.

15. The method according to claim 12, further comprising:

identifying a display delay time of the content reproduced in the external apparatus; and controlling content displayed on the external apparatus and the display apparatus to be synchronized by delaying an image signal transmitted to the display apparatus through the wired-connected connector based on the display delay time.

16. A method of controlling an electronic apparatus, the method comprising:

transmitting an image signal of predetermined image content to a display apparatus through a wired-connected connector;

receiving a user input to reproduce the predetermined image content in an external apparatus by activating a communicator for wireless communication while the image signal is transmitted to the display apparatus through the wired-connected connector;

based on identifying a connection with the external apparatus through the communicator for the wireless communication, identifying whether the image signal being transmitted to the display apparatus corresponds to high dynamic range (HDR) format or standard dynamic range (SDR) format;

based on the identifying the image signal to correspond to the HDR format, identifying whether the external apparatus, which is connected wirelessly, supports reproduction of the HDR format;

converting the image signal having attributes corresponding to the HDR format into an image signal having attributes corresponding to the SDR format which has a narrower expression range of an image than the HDR format based on reproduction of the HDR format being unsupported by the external apparatus, the attributes comprising a gamma characteristic and a color gamut characteristic; and transmitting the image signal, which is converted corresponding to the SDR format, to the display apparatus through the wired-connected connector and to the external apparatus through the communicator.

17. The method according to claim 16, wherein the electronic apparatus comprises a first image processor configured to process an image signal for output through the wired-connected connector and a second image processor configured to process an image signal for output through the communicator, and the converting of the image signal comprises converting the image signal having attributes corresponding to the HDR format into the image signal having attributes corresponding to the SDR format by the second image processor.

18. The method according to claim 17, further comprising:

identifying whether the display apparatus connected through the wired-connected connector supports the reproduction of the HDR format; and continuously transmitting the image signal having attributes corresponding to the HDR format to the display apparatus through the wired-connected connector based on the display apparatus supporting the reproduction of the HDR format.

19. A non-transitory computer-readable recording medium, having embodied thereon a program of a method executable by a processor of an electronic apparatus, the method comprising:

transmitting an image signal of predetermined image content to a display apparatus through a wired-connected connector;

receiving a user input to reproduce the predetermined image content in an external apparatus by activating a communicator for wireless communication while the image signal is transmitted to the display apparatus through the wired-connected connector;

based on identifying a connection with the external apparatus through the communicator for the wireless communication, identifying whether the image signal being transmitted to the display apparatus corresponds to high dynamic range (HDR) format or standard dynamic range (SDR) format;

based on the identifying the image signal to correspond to the HDR format, converting the image signal having attributes corresponding to the HDR format into an image signal having attributes corresponding to the SDR format which has a narrower expression range of an image than the HDR format, the attributes comprising a gamma characteristic and a color gamut characteristic; and transmitting the image signal, which is converted corresponding to the SDR format, to the display apparatus through the wired-connected connector and to the external apparatus through the communicator.

20. The electronic apparatus according to claim 1, wherein the processor is further configured to, based on the identifying the image signal to correspond to the SDR format, transmitting the image signal to the external apparatus through the communicator without performing a format conversion, and continue transmitting the image signal to the display apparatus through the connector.

* * * * *